(12) United States Patent
Ahlfeld et al.

(10) Patent No.: US 9,793,014 B2
(45) Date of Patent: Oct. 17, 2017

(54) HEAT PIPE FISSION FUEL ELEMENT

(75) Inventors: Charles E. Ahlfeld, LaJolla, CA (US); John Rogers Gilleland, Kirkland, WA (US); Roderick A. Hyde, Redmond, WA (US); Muriel Y. Ishikawa, Livermore, CA (US); David G. McAlees, Bellevue, WA (US); Nathan P. Myhrvold, Medina, WA (US); Thomas Allan Weaver, San Mateo, CA (US); Charles Whitmer, North Bend, WA (US); Lowell L. Wood, Jr., Bellevue, WA (US)

(73) Assignee: TerraPower, LLC, Bellevue, WA (US)

( * ) Notice: Subject to any disclaimer, the term of this patent is extended or adjusted under 35 U.S.C. 154(b) by 586 days.

(21) Appl. No.: 12/220,310

(22) Filed: Jul. 22, 2008

(65) Prior Publication Data
US 2009/0285349 A1 Nov. 19, 2009

Related U.S. Application Data

(63) Continuation-in-part of application No. 12/152,904, filed on May 15, 2008.

(51) Int. Cl.
| | |
|---|---|
| *G21C 3/16* | (2006.01) |
| *G21C 15/06* | (2006.01) |
| *F28D 15/04* | (2006.01) |
| *G21C 1/02* | (2006.01) |
| *F28D 21/00* | (2006.01) |

(52) U.S. Cl.
CPC ........... *G21C 15/06* (2013.01); *F28D 15/046* (2013.01); *G21C 1/026* (2013.01); *G21C 3/16* (2013.01); *F28D 2021/0054* (2013.01); *Y02E 30/34* (2013.01)

(58) Field of Classification Search
USPC ................................ 376/367, 321, 425, 455
See application file for complete search history.

(56) References Cited

U.S. PATENT DOCUMENTS

| | | | |
|---|---|---|---|
| 3,096,263 A | | 7/1963 | Kingston et al. |
| 3,437,847 A | * | 4/1969 | Raspet .......................... 310/306 |
| 3,535,562 A | | 10/1970 | Byrd |
| 3,601,638 A | * | 8/1971 | Busse ........................... 376/321 |
| 3,607,631 A | * | 9/1971 | Hobson et al. ................ 376/321 |

(Continued)

FOREIGN PATENT DOCUMENTS

| | | |
|---|---|---|
| DE | 1539689 | 1/1970 |
| DE | 2142744 | 3/1973 |

(Continued)

OTHER PUBLICATIONS

Akhiezer, A. I.; Khizhnyak, N. A.; Shulga, N. F.; Pilipenko, V. V.; and Davydov, L. N.; "Slow Nuclear Burning"; Problems of Atomic Science and Technology; 2001; pp. 272-275; vol. 6.

(Continued)

*Primary Examiner* — Sean P Burke

(57) ABSTRACT

Illustrative embodiments provide nuclear fission fuel elements, and systems, applications, apparatuses, and methods related thereto. Illustrative embodiments and aspects include, without limitation, nuclear fission fuel elements, heat pipe assemblies, heat pipes, methods of fabricating a nuclear fission fuel element, methods of fabricating a heat pipe assembly, and the like.

14 Claims, 25 Drawing Sheets

(56) References Cited

U.S. PATENT DOCUMENTS

| | | | |
|---|---|---|---|
| 3,629,063 A * | 12/1971 | Houston | 376/456 |
| 3,668,070 A | 6/1972 | Fiebelmann et al. | |
| 3,854,524 A * | 12/1974 | Gregorie et al. | 376/298 |
| 3,935,063 A | 1/1976 | Dunckel | |
| 4,072,559 A | 2/1978 | Neidl et al. | |
| 4,113,563 A | 9/1978 | Tobin | |
| 4,270,938 A | 6/1981 | Schmidt et al. | |
| T101,204 I4 * | 11/1981 | Hampel | 376/221 |
| 4,303,474 A | 12/1981 | Baxi | |
| 4,478,784 A | 10/1984 | Burelbach | |
| 4,560,533 A | 12/1985 | Huebotter et al. | |
| 4,591,479 A | 5/1986 | Weitzberg | |
| 4,604,785 A | 8/1986 | Eddens | |
| 4,636,352 A | 1/1987 | Boyle | |
| 4,749,544 A | 6/1988 | Crowther et al. | |
| 4,851,183 A | 7/1989 | Hampel | |
| 5,039,475 A * | 8/1991 | Kennel et al. | 376/321 |
| 5,182,077 A | 1/1993 | Feinroth | |
| 5,223,210 A | 6/1993 | Hunsbedt et al. | |
| 5,264,056 A | 11/1993 | Lapides | |
| 5,307,387 A | 4/1994 | Nakajima et al. | |
| 5,309,493 A * | 5/1994 | Kamimura et al. | 376/431 |
| 5,353,321 A | 10/1994 | Rybnikov | |
| 5,408,510 A | 4/1995 | Ball et al. | |
| 5,420,897 A | 5/1995 | Kasai et al. | |
| 5,493,592 A | 2/1996 | Garzarolli et al. | |
| 5,684,848 A | 11/1997 | Gou et al. | |
| 5,774,514 A | 6/1998 | Rubbia | |
| 6,120,706 A * | 9/2000 | Lessing et al. | 252/478 |
| 6,233,298 B1 | 5/2001 | Bowman | |
| 6,353,651 B1 | 3/2002 | Gou et al. | |
| 6,512,805 B1 | 1/2003 | Takeda et al. | |
| 6,684,848 B2 | 2/2004 | Saito et al. | |
| 6,718,001 B2 | 4/2004 | Hidaka et al. | |
| 6,768,781 B1 * | 7/2004 | Moriarty | 376/367 |
| 6,810,099 B2 | 10/2004 | Nakamaru et al. | |
| 6,810,946 B2 | 11/2004 | Hoang | |
| 6,876,714 B2 | 4/2005 | Rubbia | |
| 6,878,952 B1 | 4/2005 | Ohsono et al. | |
| 6,888,910 B1 | 5/2005 | Moriarty | |
| 6,944,255 B2 | 9/2005 | Hattori et al. | |
| 7,860,207 B2 | 12/2010 | Hyde et al. | |
| 2004/0047445 A1 * | 3/2004 | Delafoy et al. | 376/409 |
| 2004/0182088 A1 | 9/2004 | Ghoshal et al. | |
| 2005/0069075 A1 | 3/2005 | D'Auvergne | |
| 2006/0056572 A1 | 3/2006 | Lecomte | |
| 2006/0171498 A1 | 8/2006 | D'auvergne | |
| 2006/0227924 A1 | 10/2006 | Hallstadius et al. | |
| 2008/0069289 A1 | 3/2008 | Peterson | |
| 2008/0123795 A1 | 5/2008 | Hyde et al. | |
| 2008/0123797 A1 | 5/2008 | Hyde et al. | |
| 2009/0080592 A1 * | 3/2009 | Arsenlis et al. | 376/412 |
| 2009/0285348 A1 | 11/2009 | Ahlfeld et al. | |

FOREIGN PATENT DOCUMENTS

| | | |
|---|---|---|
| GB | 1063696 | 3/1967 |
| JP | 2002-181976 A | 6/2002 |
| WO | WO 2009/136971 A2 | 11/2009 |
| WO | WO 2009/139899 | 11/2009 |

OTHER PUBLICATIONS

Atefi, B.; Driscoll, M. J.; and Lanning, D. D.; "An Evaluation of the Breed/Burn Fast Reactor Concept"; Massachusetts Institute of Technology, Department of Nuclear Engineering; Dec. 1979; pp. 1-295.

Feinberg, S. M.; "Discussion Comment"; Rec. of Proc. Session B-10 of the ICPUAE; Sep. 10, 1958; p. 447-449; No. 2, vol. 9; Geneva, Switzerland.

Feoktistov, L. P.; "An Analysis of a Concept of a Physically Safe Reactor"; Preprint IAE-4605/4; Moscow: IAE; 1988; pp. 1-9; in Russian.

Feoktistov, L. P.; "Neutron-Fissioning Wave"; Dokl. Akad. Nauk SSSR; 1989; pp. 864-867; in Russian.

Fomin, S. P.; Mel'nik, Yu. P.; Pilipenko, V. V.; and Shul'ga, N. F.; "Study of Self-Organizing Regime of Nuclear Burning Wave in Fast Reactor"; Problems of Atomic Science and Technology; 2005; pp. 106-113, No. 6.

Ohoka, Y.; and Sekimoto, H.; "Application of CANDLE Burnup to Block-Type High Temperature Gas Cooled Reactor"; Nuclear Engineering and Design; 2004; pp. 15-23; vol. 229; Elsevier B. V.

Sekimoto, Hiroshi; "Application of CANDLE Burnup Strategy for Future Nuclear Energy Utilization"; Progress in Nuclear Energy; 2005; pp. 91-98; vol. 47; No. 1-4; Elsevier Ltd.; Great Britain.

Sekimoto, Hiroshi; "Fuel-Cycle of CANDLE Burnup with Depleted Uranium"; Proc. of ICAPP 2005; May 15-19, 2005; Seoul, Korea.

Sekimoto, Hiroshi; "Fuel-Cycle of CANDLE Burnup with Depleted Uranium"; Proc. of ICAPP 2006; Jun. 4-8, 2006, Reno, Nevada; pp. 1908-1914; American Nuclear Society; LaGrange Park, IL.

Sekimoto, Hiroshi and Ryu, Kouichi; "A New Reactor Burnup Concept 'CANDLE'"; Proc. of PHYSOR2000; May 7-11, 2000; pp. 1-9; Pittsburgh, PA.

Sekimoto, Hiroshi; Ryu, Kouichi; and Yoshimura, Yoshikane; "Candle: The New Burnup Strategy"; Nuclear Science and Engineering; 2001; pp. 306-317; vol. 139.

Sekimoto, Hiroshi and Tanaka, Kohtaro; "Candle Burnup for Different Cores"; Proc. of PHYSOR 2002: International Conference on the New Frontiers of Nuclear Technology: Reactor Physics, Safety and High-Performance Computing; Oct. 7-10, 2002; pp. 1-12; Seoul, Korea.

Sekimoto, Hiroshi; Toshinsky, V.; and Ryu, K.; "Natural Uranium Utilization without Enrichment and Reprocessing"; Proc. of GLOBAL 2001; Sep. 9-13, 2001; pp. 1-3; Paris, France.

Soentono, Soedyartomo; "Nuclear Power Development in Indonesia"; Proc. of Energy Future and the Nuclear Fuel Cycle in the Asia/Pacific Region, 19th Annual Conference Industrial Liaison Program; pp. 51-61; Mar. 12, 1997.

Toshinsky, Georgy I.; "LMFBR Operation in the Nuclear Cycle Without Fuel Reprocessing"; Proceedings of the International Topical Meeting on Advanced Reactors Safety (ARS '97); Jun. 1-5, 1997; pp. 39-44; vol. I; Orlando, FL.

Toshinsky, Vladimir G.; Sekimoto, Hiroshi; and Toshinsky, Georgy I.; "Multiobjective Fuel Management Optimization for Self-Fuel-Providing LMFBR Using Genetic Algorithms"; Annals of Nuclear Energy; 1999; pp. 783-802; vol. 26; Elsevier Science Ltd.

Van Dam, Hugo; "The Self-Stabilizing Criticality Wave Reactor"; Proc. of the Tenth International Conference on Emerging Nuclear Energy Systems (ICENES 2000); 2000; pp. 009.1-009.10; Petten, Netherlands.

Yarsky, P.; Driscoll, M. J.; and Hejzlar, P.; "Integrated Design of a Breed and Burn Gas-Cooled Fast Reactor Core"; The MIT Center for Advanced Nuclear Energy Systems (CANES); Document No. MIT-ANP-TR-107; Sep. 2005; pp. 1-253.

PCT International Search Report; International App. No. PCT/US2009/04512; Dec. 7, 2009; pp. 1-2.

U.S. Appl. No. 11/605,933, Hyde et al.

U.S. Appl. No. 11/605,848, Hyde et al.

Hyde, Roderick; Ishikawa, Muriel; Myhrvold, Nathan; Nuckolls, John; Wood, Lowell; "Nuclear Fission Power for $21^{st}$ Century Needs: Enabling Technologies for Large-Scale, Low-Risk, Affordable Nuclear Electricity" [Abstract]; p. 1.

Teller, Edward; Ishikawa, Muriel; Wood, Lowell; "Completely Automated Nuclear Reactors for Long-Term Operation"; "Frontiers in Physics Symposium"; bearing dates of Oct. 26-28, 1995 and Jan. 1996; pp. 1-13; Lawrence Livermore National Laboratory; Livermore, California.

Teller, Edward; Ishikawa, Muriel; Wood, Lowell; Hyde, Roderick; Nuckolls, John; "Completely Automated Nuclear Power Reactors for Long-Term Operation: III. Enabling Technology For Large-Scale, Low-Risk, Affordable Nuclear Electricity"; presented at the Jul. 2003 Workshop of the Aspen Global Change Institute; pp. 1-57; University of California Lawrence Livermore National Laboratory; Livermore, California.

Teller, Edward; Ishikawa, Muriel; Wood, Lowell; Hyde, Roderick; Nuckolls, John; "Completely Automated Nuclear Reactors for

(56) References Cited

OTHER PUBLICATIONS

Long-Term Operation II: Toward A Concept-Level Point-Design Of A High-Temperature, Gas-Cooled Central Power Station System"; 1996 International Conference on Emerging Nuclear Energy Systems; bearing dates of Jun. 20, 1996 and Jun. 24-28, 1996; pp. 1-44; Lawrence Livermore National Laboratory; Livermore, California.
Teller, Edward; Wood, Lowell; Nuckolls, John; Ishikawa, Muriel; Hyde, Roderick; "Problem-Free Nuclear Power and Global Change"; $22^{nd}$ International Symposium on Planetary Emergencies; bearing dates of Aug. 15, 1997 and Aug. 20-23, 1997; pp. 1-10; Lawrence Livermore National Laboratory; Livermore, California.
Wood, Lowell; Hyde, Rod; Ishikawa, Muriel; "Novel Approaches to Nuclear Fission Power Generation: A Practical, *Manifestly* Safe Point-Design for World-Wide Civil Use in the $21^{st}$ Century"; LLNL P&AT/CGSR ad hoc session; bearing a date of Apr. 25, 2001; pp. 1-15.
Wood, Lowell; Ishikawa, Muriel; Hyde, Roderick; "Global Warming and Nuclear Power"; Innovative Energy Systems and CO2 Stabilization; bearing dates of Jul. 10, 1998 and Jul. 14-24, 1998; pp. 1-22; Lawrence Livermore National Laboratory; Livermore, California.
PCT International Search Report; International App. No. PCT/US09/03028; Jul. 7, 2009; pp. 1-2.
Teller, Edward; Ishikawa, Muriel; Wood, Lowell; "Completely Automated Nuclear Reactors for Long-Term Operation"; Frontiers in Physics Symposium, Joint American Physical Society and the America Association of Physics Teachers Texas meeting Oct. 26-28, 1995; Jan. 1996; Lubbock, Texas; pp. 1-15.
Wood, Lowell; Ishikawa, Muriel; Hyde, Roderick; "Global Warming and Nuclear Power"; $9^{th}$ Summer Workshop, Innovative Energy Systems and CO2 Stabilization Jul. 14-24, 1998, Aspen Global Change Institute; Jul. 10, 1998; Aspen, Colorado; pp. 1-21.
PCT International Search Report; International App. No. PCT/US2007/024392; Oct. 7, 2008; pp. 1-4.
PCT International Search Report; International App. No. PCT/US2007/024445; Aug. 26, 2008; pp. 1-2.
PCT International Search Report; International App. No. PCT/US2007/024375; Oct. 7, 2008; pp. 1-4.
European Patent Office, Summons to attend oral proceedings pursuant to Rule 115(1) EPC; App. No. 07872643.7; Feb. 21, 2013; pp. 1-4.
Ohoka, Yasunori et al.; "Simulation Study on CANDLE Burnup Applied to Block-type High Temperature Gas Cooled Reactor"; COE-INES International Symposium INES-1 #4 Oct. 31-Nov. 4, 2004; pp. 1-17.
Teller, Edward et al. "Completely Automated Nuclear Reactors for Long-Term Operation"; Frontiers in Physics Symposium Oct. 26-28, 1995; bearing a date of Jan. 1996; Joint American Physical Society and the American Association of Physics Teachers Texas Meeting.
Teller, Edward; "Nuclear Energy for the Third Millennium"; International Conference on Environment and Nuclear Energy Oct. 27-29, 1997; bearing a date of Oct. 1997; pp. 1-14; Lawrence Livermore National Laboratory.
Russian Federal Service for Intellectual Property; Office Action; Russian Application No. 2010147880; Oct. 17, 2012 ; 19 pages; (machine translation to English provided, 12 pages).
Chinese Patent Office; First Office Action; App. No. 2007/80049972.8 (based on PCT Patent Application No. PCT/US07/024375); Feb. 1, 2012; pp. 1-4.
Chen et al.; "Transverse buckling effects on solitary burn-up waves"; Annals of Nuclear Energy; bearing dates of Dec. 24, 2004, Jan. 5, 2005, and Apr. 29, 2005; pp. 1377-1390; vol. 32; Elsevier Ltd.
St. Clair, Richard; Summary of MIT-Tokyo Tech Symposium on Innovative Nuclear Energy Systems; Nov. 2-4, 2005; pp. 1-17; MIT Department of Nuclear Science and Engineering; Cambridge, MA.
Emelyanov, I. Y. et al.; "Construction of Nuclear Reactors: Textbook for Schools"; bearing a date of 1982; 2 pages; Energoizdat; Moscow, Russia (machine translation to English provided, 1 page).
Samoilov, A. G. et al.; "Nuclear Reactor Fuel Element"; bearing a date of 1996; 10 pages; Energoatomizdat; Moscow, Russia; (machine translation to English provided, 10 pages).
European Patent Office Search Report; App. No. EP 07 872 643.7; Feb. 3, 2012; pp. 1-3.
European Patent Office Search Report; App. No. EP 09 74 6986; Feb. 22, 2012; pp. 1-7.
Chinese Patent Office; First Office Action; App. No. 2007/80049941.2; Jan. 29, 2012; pp. 1-6; no translation available.
(Author unknown); "CEFR"; bearing a date of Oct. 1, 1998; pp. 1-1 through 1-8; no translation available.
European Patent Office; Communication Pursuant to Article 94(3) EPC; Application No. 09 746 986.0; Jan. 31, 2013; pp. 1-5.
Chinese Patent Office; Second Office Action; Patent App. No. 200780049972.8; Dec. 31, 2012; pp. 1-6 (no translation provided).
Japanese Patent Office; Office Action; Patent App. No. 2009-539277; Jan. 8, 2013; pp. 1-4 (no translation provided).
European Patent Office; European Search Report; Application No. EP 07 87 3851; Dec. 21, 2012; pp. 1-4.
European Patent Office; European Search Report; Application No. EP 09 80 6943; Dec. 21, 2012; pp. 1-3.
European Search Report; App. No. 07872643; Jun. 6, 2011; pp. 1-13.
Ohoka, Yasunori; Watanabe, Takashi; and Sekimoto, Hiroshi; "Simulation Study on Candle Burnup Applied to Block-Type High Temperature Gas Cooled Reactor"; Progress in Nuclear Energy; 2005; pp. 292-299; vol. 47, No. 1-4; Elsevier, Ltd.; Great Britain.
Sekimoto, Hiroshi; and Miyashita, Seiichi; "Startup of "Candle" Burnup in Fast Reactor from Enriched Uranium Core"; Energy Conversion and Management; 2006; pp. 2272-2780; vol. 47; Elsevier, Ltd.
"Accelerator-driven Systems (ADS) and Fast Reactors (FR) in Advanced Nuclear Fuel Cycles: A Comparative Study"; Nuclear Energy Agency Organisation for Economic Co-Operation and Development; May 2, 2002 (as provided by examiner); pp. 43-46 (6 pages total); OECD Publications, Paris Cedex, France.
Wang et al.; "Trial-manufacture of Cladding Materials of Core Subassemblies in China Experimental Fast Reactor"; Atomic Energy Science and Technology; Jul. 2003; pp. 73-76; vol. 37, Suppl. (English Abstract provided).
Xu et al.; "China Experimental Fast Reactor"; China Institute of Atomic Energy, Beijing; 1995; pp. 53-59; China Academic Journal Electronic Publishing House, Peking, China.

\* cited by examiner

HEAT PIPE FISSION FUEL ELEMENT

RELATED APPLICATIONS

For purposes of the USPTO extra-statutory requirements, the present application constitutes a continuation-in-part of U.S. patent application No. 12/152,904, entitled HEAT PIPE FISSION FUEL ELEMENT, naming Charles E. Ahlfeld, John Rogers Gilleland, Roderick A. Hyde, Muriel Y. Ishikawa, David G. McAlees, Nathan P. Myhrvold, Thomas Allan Weaver, Charles Whitmer, and Lowell L. Wood, Jr. as inventors, filed 15 May 2008, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND

The present application relates to nuclear fission fuel elements, and systems, applications, apparatuses, and methods related thereto.

SUMMARY

Illustrative embodiments provide nuclear fission fuel elements, and systems, applications, apparatuses, and methods related thereto. Illustrative embodiments and aspects include, without limitation, nuclear fission fuel elements, heat pipe assemblies, heat pipes, methods of fabricating a nuclear fission fuel element, methods of fabricating a heat pipe assembly, and the like.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
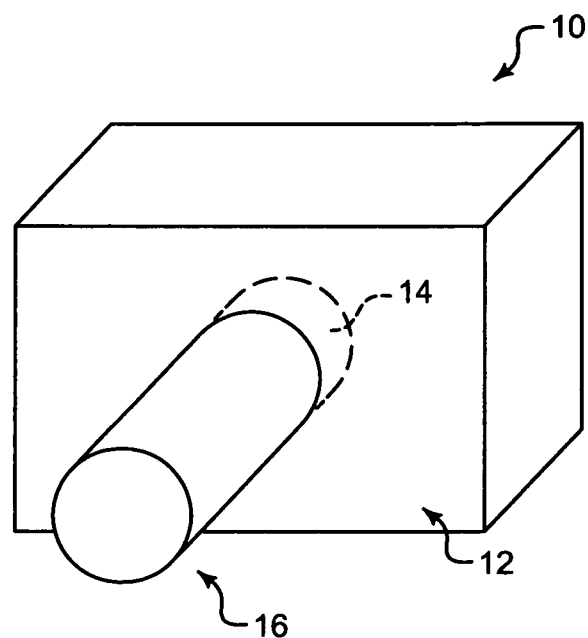
FIG. 1A is a perspective view in schematic form of an illustrative nuclear fission fuel element.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

By way of overview, illustrative embodiments provide nuclear fission fuel elements, and systems, applications, apparatuses, and methods related thereto. Illustrative embodiments and aspects include, without limitation, nuclear fission fuel elements, heat pipe assemblies, heat pipes, methods of fabricating a nuclear fission fuel element, methods of fabricating a heat pipe assembly, and the like.

Still by way of overview and given by way of non-limiting examples, some embodiments may be provided as nuclear fission fuel elements that include at least one heat pipe disposed therein while some other embodiments may be provided as heat pipes with nuclear fission fuel material disposed therein.

Still by way of overview and referring to FIG. 1A, an illustrative nuclear fission fuel element 10 will be discussed by way of illustration and not limitation. The illustrative nuclear fission fuel element 10 suitably includes nuclear fission fuel material 12. At least a portion 14 (shown in phantom) of a heat pipe 16 is disposed within the nuclear fission fuel material 12.

No limitations whatsoever are intended regarding the nuclear fission fuel material 12. To that end, the nuclear fission fuel material 12 suitably may be any type of nuclear fission fuel material as desired for a particular application. As such, the nuclear fission fuel material 12 may be provided in the form of a metal, a compound, an alloy, or any combination thereof as desired. The nuclear fission fuel material 12 may be usable in any type of nuclear fission reactor whatsoever with any neutron spectrum whatsoever. For example, in some embodiments the nuclear fission fuel material 12 may be usable in nuclear fission reactors having a thermal neutron spectrum. In some other embodiments the nuclear fission fuel material 12 may be usable in nuclear fission reactors having a fast neutron spectrum.

Moreover, in some embodiments the nuclear fission fuel material 12 may be usable in breeder reactors, such as without limitation fast breeder reactors like nuclear fission deflagration wave fast breeder reactors. Nuclear fission deflagration wave fast breeder reactors are discussed in U.S. patent application Ser. No. 11/605,943, entitled AUTOMATED NUCLEAR POWER REACTOR FOR LONG-TERM OPERATION, naming RODERICK A. HYDE, MURIEL Y. ISHIKAWA, NATHAN P. MYHRVOLD, AND LOWELL L. WOOD, JR. as inventors, filed 28 Nov. 2006, which is currently co-pending, or is an application of which a currently co-pending application is entitled to the benefit of the filing date, the entire contents of which are hereby incorporated by reference. To that end, in some embodiments the nuclear fission fuel material 12 may include fissile material and/or fertile material. In such cases, the fissile material may include any one or more of $^{233}$U, $^{235}$U, and/or $^{239}$Pu, and the fertile material may include any one or more of $^{232}$Th and/or $^{238}$U.

Furthermore, no limitation whatsoever is intended regarding geometry of the nuclear fission fuel element 10. The geometric configuration shown in the drawing herein is used for illustrative purposes only. No limitation to any particular geometric configuration of the nuclear fission fuel element 10 is intended to be implied and, accordingly, none should be inferred.

Figure 1B:
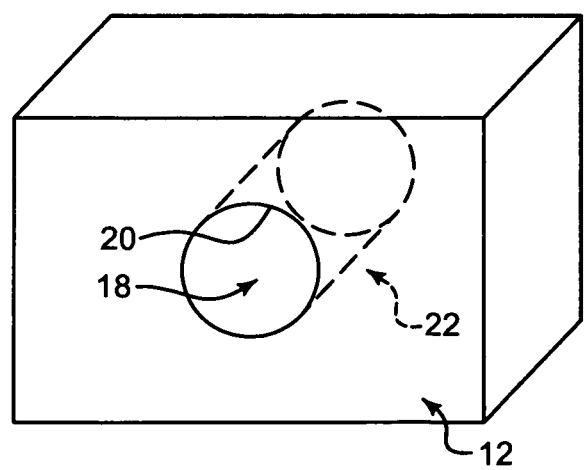
FIG. 1B is a perspective view in schematic form of details of the nuclear fission fuel element of FIG. 1A.

Referring additionally to FIG. 1B, in some embodiments a cavity 18 may be defined in the nuclear fission fuel material 12. In some embodiments, the cavity 18 may be a passageway that is defined through at least the portion 14 of the nuclear fission fuel material 12. Thus, in some embodiments, a surface 20 of the cavity 18 may be a wall of the portion 14 (FIG. 1A) of the heat pipe 16 (FIG. 1A). The cavity 18 may be defined in any suitable manner. For example, in some embodiments the cavity 18 may be defined by machining the cavity from the nuclear fission fuel material 12 in any manner as desired, such as by drilling, milling, stamping, or the like. In some other embodiments the cavity 18 may be defined by forming at least a portion 22 of the nuclear fission fuel material 12 around a shape, such as without limitation a mandrel (not shown). The forming may be performed in any manner as desired, such as without limitation by welding, casting, electroplating, pressing, molding, or the like.

Referring now to FIGS. 2A-2D, a wall 24 of the heat pipe 16 extends from the cavity 18 in the nuclear fission fuel material 12, thereby substantially acting as an extension of the surface 20. As such, the cavity 18 can be considered to be substantially sealed. The wall 24 may be made of any suitable material as desired for high-temperature operations and/or, if desired, a neutron flux environment. Given by way of non-limiting example, in some embodiments the wall 24 may be made of any one or more of materials such as steel, niobium, vanadium, titanium, a refractory metal, and/or a refractory alloy. Given by way of non-limiting example, in some embodiments the refractory metal may be niobium, tantalum, tungsten, hafnium, rhenium, or molybdenum. Non-limiting examples of refractory alloys include, rhenium-tantalum alloys as disclosed in U.S. Pat. No. 6,902,809, tantalum alloy T-111, molybdenum alloy TZM, tungsten alloy MT-185, or niobium alloy Nb-1Zr.

A capillary structure 26 of the heat pipe 16 is defined within at least a portion of the cavity 18. That is, the surface 20 is a wall that surrounds a portion of the capillary structure 26. In some embodiments, the capillary structure 26 may also be defined in an interior of the heat pipe 16 that is outside the nuclear fission fuel material 12 and enclosed by the wall 24. In some embodiments, the capillary structure may be a wick. The wick may be made of any suitable material as desired, such as thorium, molybdenum, tungsten, steel, tantalum, zirconium, carbon, and a refractory metal.

Figure 3A:
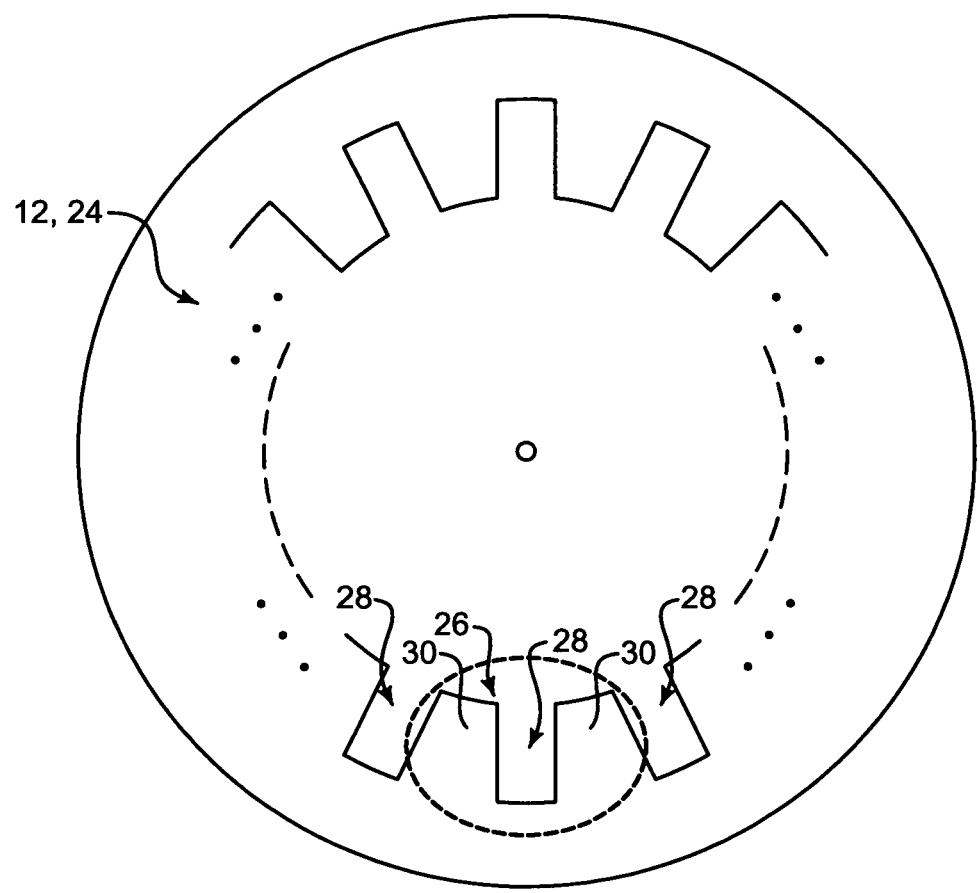
FIG. 3A is a cutaway end plan view in schematic form of a portion of embodiments of the illustrative nuclear fission fuel elements of FIGS. 2A-2D.
Figure 3B:
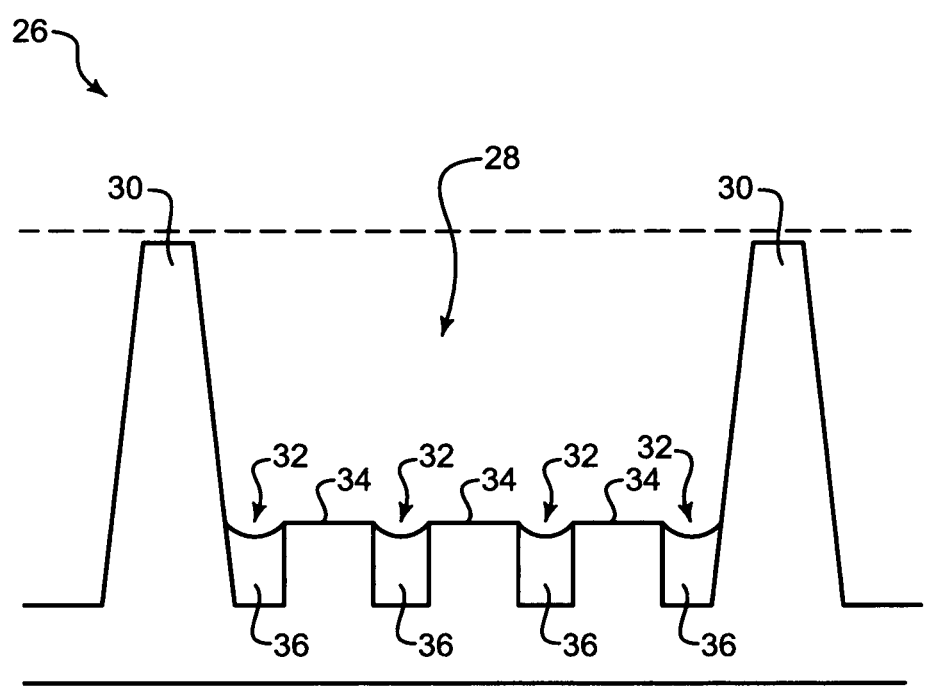
FIG. 3B illustrates details of the portion shown in FIG. 3A.

In some other embodiments and referring briefly to FIGS. 3A and 3B, the capillary structure 26 may be provided as axial grooves 28. The grooves 28 are separated by lands 30. In some embodiments, within the groove 28 are defined additional grooves 32. The grooves 32 may be separated from each other by two lands 34 or by one of the lands 30 and one of the lands 34. The grooves 28 and 32 may be defined by any suitable method as desired, such as without limitation machining, etching, casting, stamping, or the like.

Referring back to FIGS. 2A-2D and to FIG. 3B, a working fluid 36 (FIG. 3B) is provided within the heat pipe 16. The working fluid 36 suitably is evaporable and condensable. Given by way of non-limiting examples, the working fluid 36 may include any suitable working fluid as desired, such as without limitation $^{7}$Li, sodium, potassium, or the like.

Figure 2A:
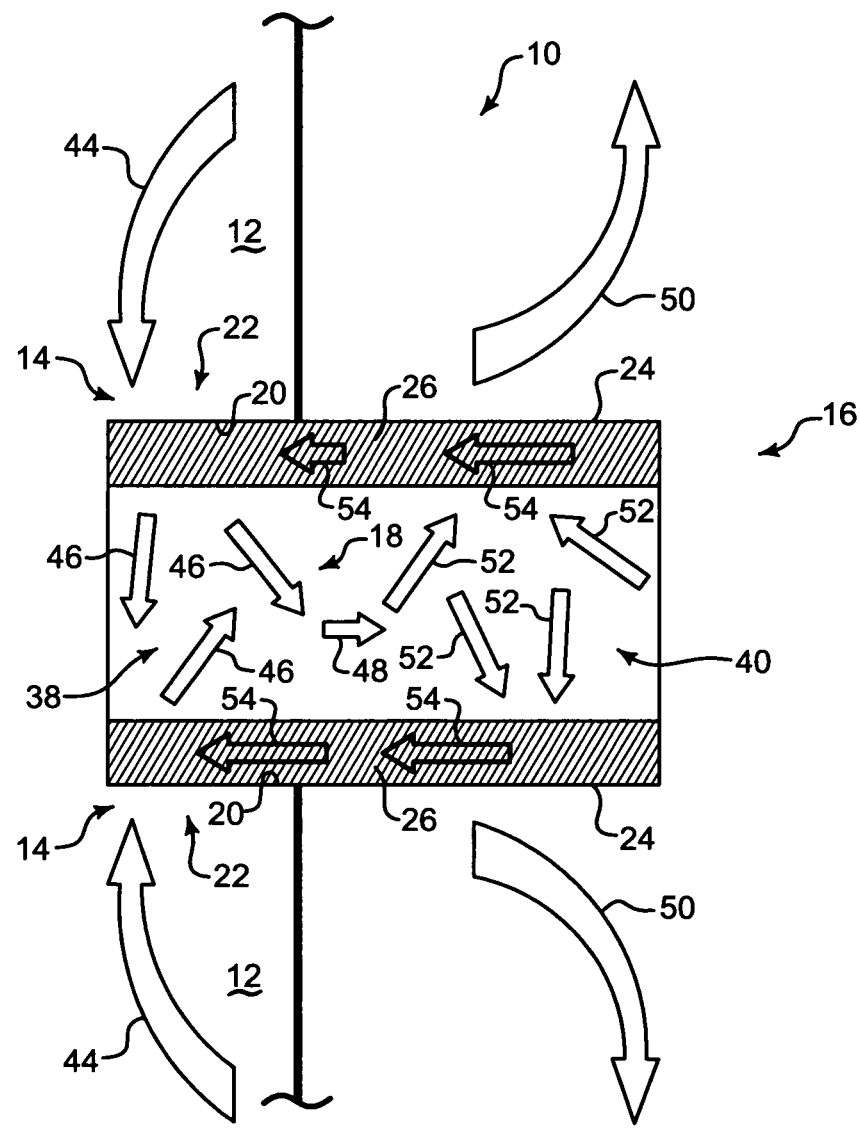
FIG. 2A is a cutaway side plan view in schematic form of an illustrative nuclear fission fuel element.
Figure 2B:
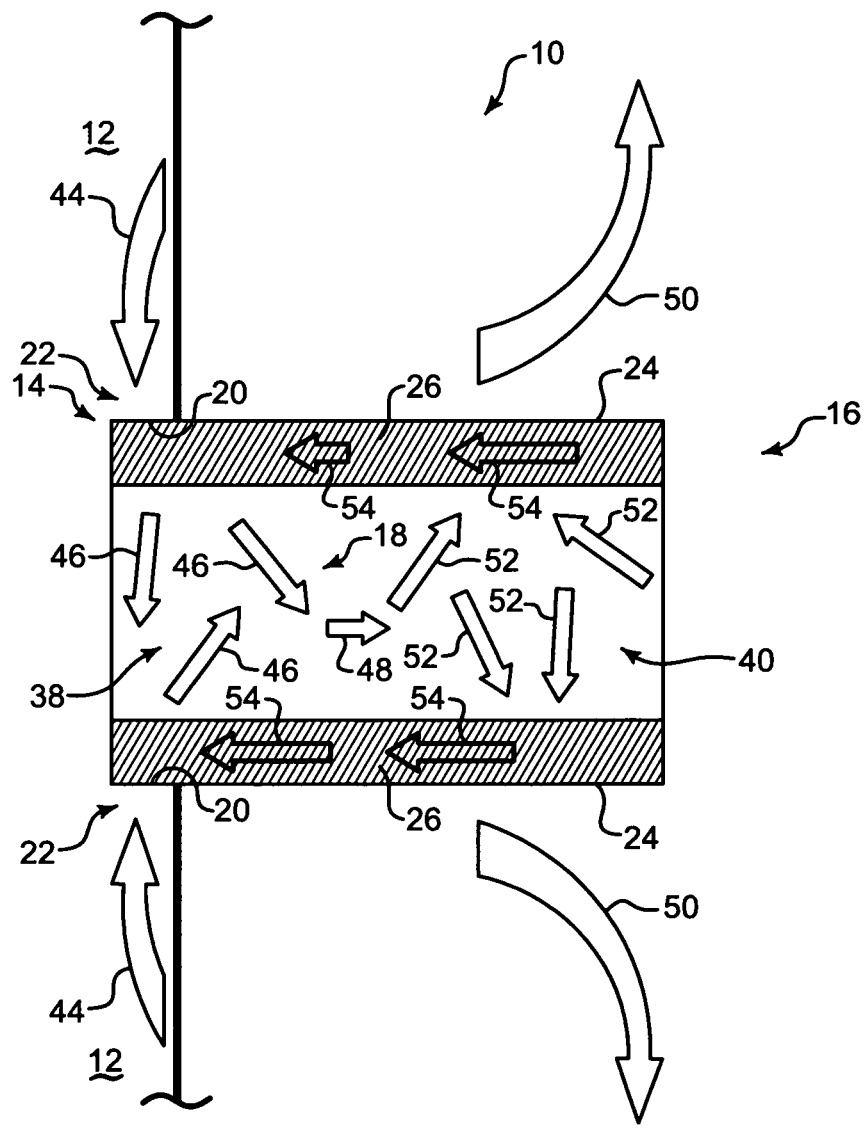
FIG. 2B is a cutaway side plan view in schematic form of another illustrative nuclear fission fuel element.
Figure 2C:
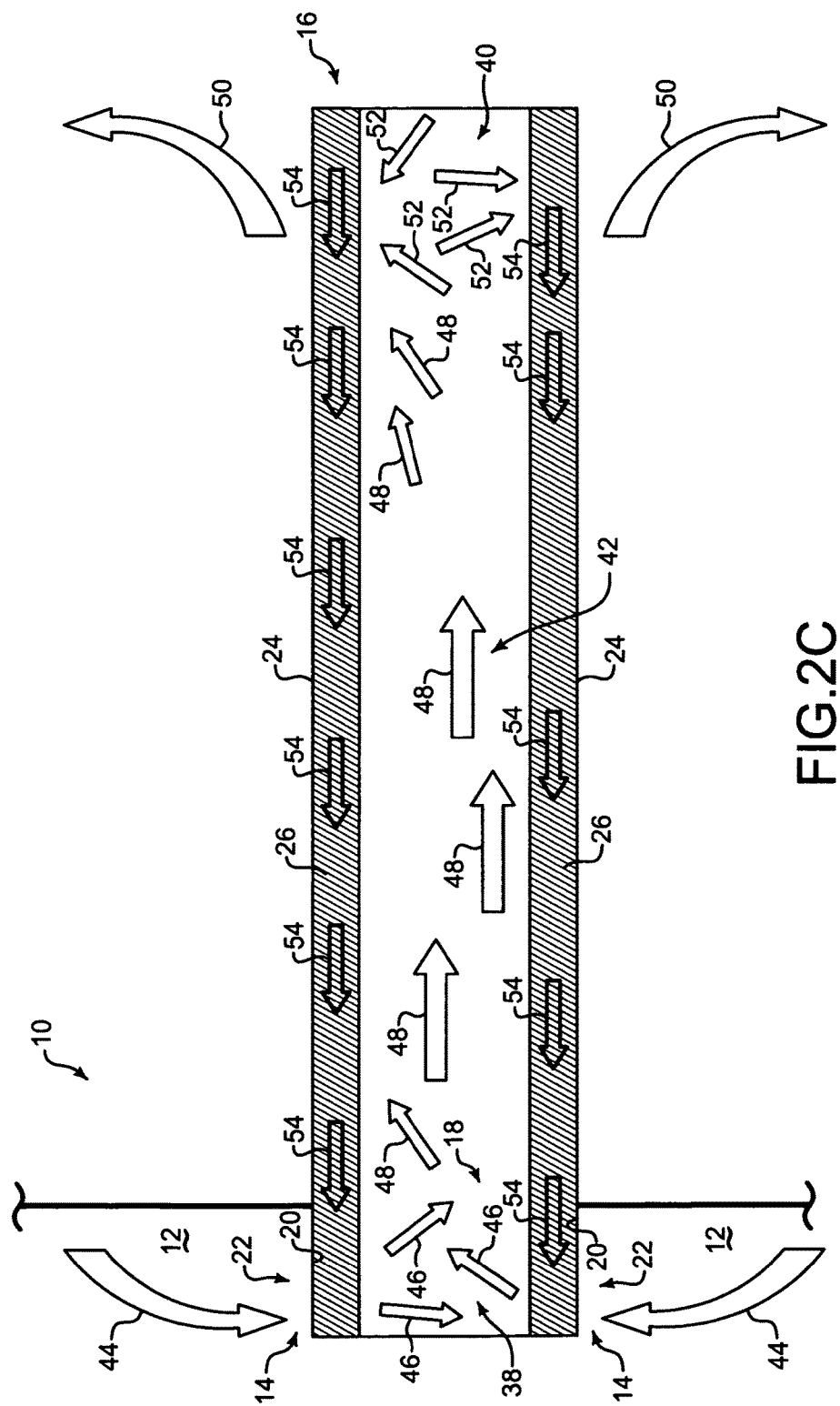
FIG. 2C is a cutaway side plan view in schematic form of another illustrative nuclear fission fuel element.
Figure 2D:
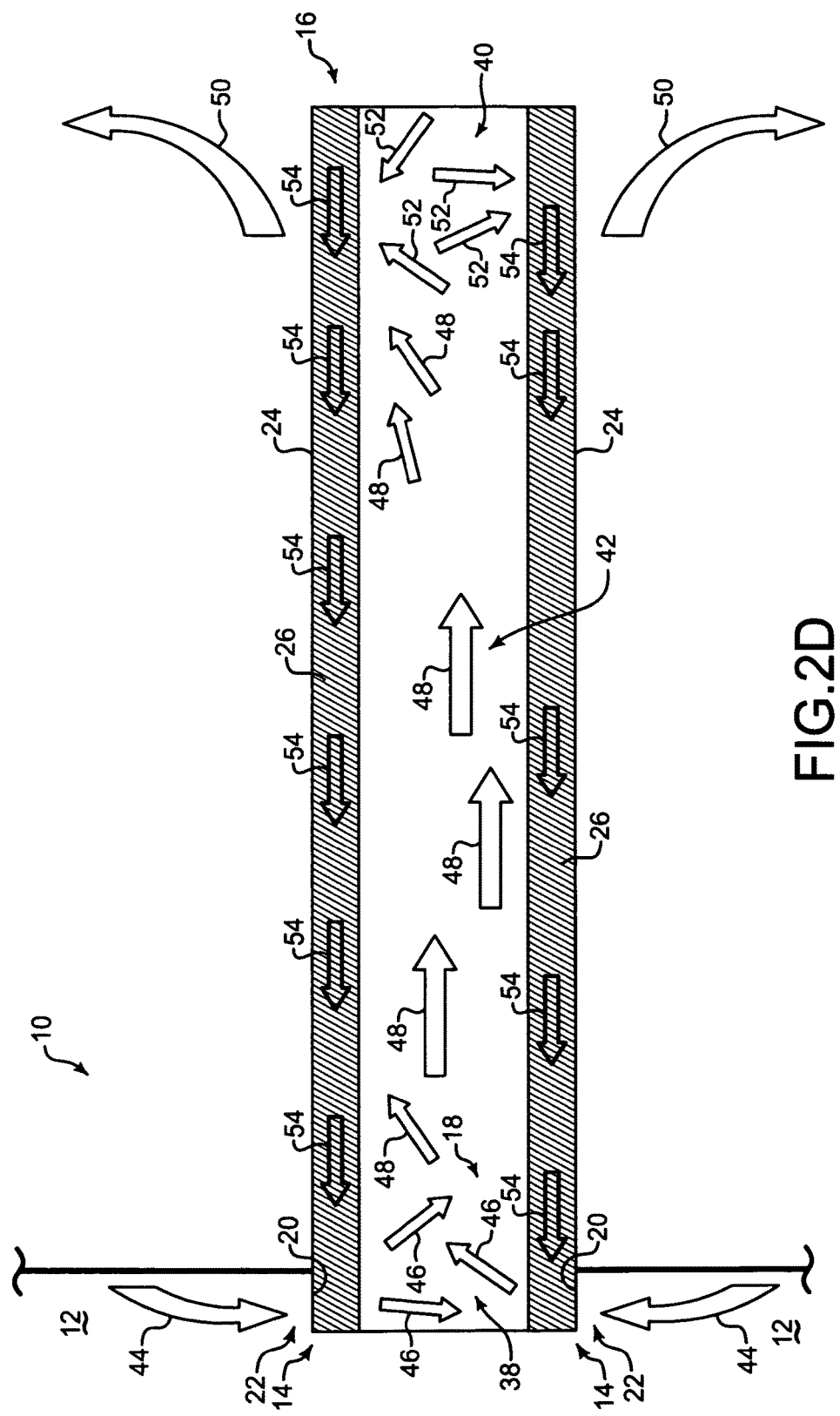
FIG. 2D is a cutaway side plan view in schematic form of another illustrative nuclear fission fuel element.

Referring to FIGS. 2A-2D, the heat pipe 16 includes an evaporator section 38 and a condenser section 40. In some embodiments and as shown in FIGS. 2A and 2C, the evaporator section 38 may be disposed entirely or substantially within the nuclear fission fuel material 12. However, it will be appreciated that the evaporator section 38 need not be disposed entirely or substantially within the nuclear fission fuel material 12. To that end, in some other embodiments and as shown in FIGS. 2B and 2D, at least a portion of the evaporator section 38 is not within the nuclear fission fuel material 12. As shown in FIGS. 2A-2D, in some embodiments the condenser section 40 may be disposed entirely external to the nuclear fission fuel material 12. However, in some other embodiments (not shown) a portion of the condenser section 40 may be disposed within the nuclear fission fuel material 12 and at least a portion of the condenser section 40 is not within the nuclear fission fuel material 12.

In some embodiments and referring now to FIGS. 2C and 2D, the heat pipe 16 may also include an adiabatic section 42. As shown in FIGS. 2C and 2D, in some embodiments the adiabatic section 42 may be disposed entirely external to the nuclear fission fuel material 12. However, in some other embodiments (not shown) a portion of the adiabatic section 42 may be disposed within the nuclear fission fuel material 12 and at least a portion a portion of the adiabatic section 42 is not within the nuclear fission fuel material 12.

Referring now to FIGS. 2A-2D, heat from the nuclear fission fuel material 12 is transferred to the evaporator section 38 as indicated by arrows 44. The working fluid 36 in the evaporator section 38 evaporates, as indicated by arrows 46, thereby undergoing phase transformation from a liquid to a gas. The working fluid 36 in gaseous form moves through the heat pipe 16, as indicated by arrows 48, from the evaporator section 38, when applicable (in some embodiments) through the adiabatic section 42 (FIGS. 2C and 2D), and to the condenser section 40. At the condenser section 40, heat from the working fluid 36 is transferred out of the heat pipe 16, as indicated by arrows 50. The working fluid 36 in the condenser section 40 condenses, as indicated by arrows 52, thereby undergoing phase transformation from a gas to a liquid. The working fluid 36 in liquid form returns from the condenser section 40 to the evaporator section 38, as indicated by arrows 54, via capillary action in the capillary structure 26. When applicable, in some embodiments the working fluid 36 in liquid form returns from the condenser section 40 through the adiabatic section 42 (FIGS. 2C and 2D) to the evaporator section 38.

Thus, referring back to FIGS. 1A, 1B, and 2A-2D, it will be appreciated that in some embodiments the assembly shown in FIGS. 1A, 1B, and 2A-2D can be a heat pipe assembly that includes the heat pipe 16 and the nuclear fission fuel material 12. As described above, the nuclear fission fuel material 12 is integral with the heat pipe 16 and is disposed in thermal communication with the heat pipe 16. That is, the nuclear fission fuel material 12 defines the cavity 18 therein and at least the portion 14 of the heat pipe 16 is disposed within the cavity 18.

Referring now to FIGS. 4A-4D, in some other embodiments a heat pipe assembly 60 includes a heat pipe device 62. The heat pipe device 62 includes a wall section 63. As will be discussed below, nuclear fission fuel material 64 is integral with the heat pipe device 62 and is disposed in thermal communication with the heat pipe device 62. The nuclear fission fuel material 64 suitably is similar to the nuclear fission fuel material 12 (FIGS. 1A, B, and 2A-2D) described above, and details need not be repeated.

Embodiments of the heat pipe assembly 60 share some features in common with the nuclear fission fuel element 10 (FIGS. 1A, 1B, 2A-2D, 3A, and 3B). Common reference numbers will be used to refer to common features, and details need not be repeated for an understanding.

Figure 5A:
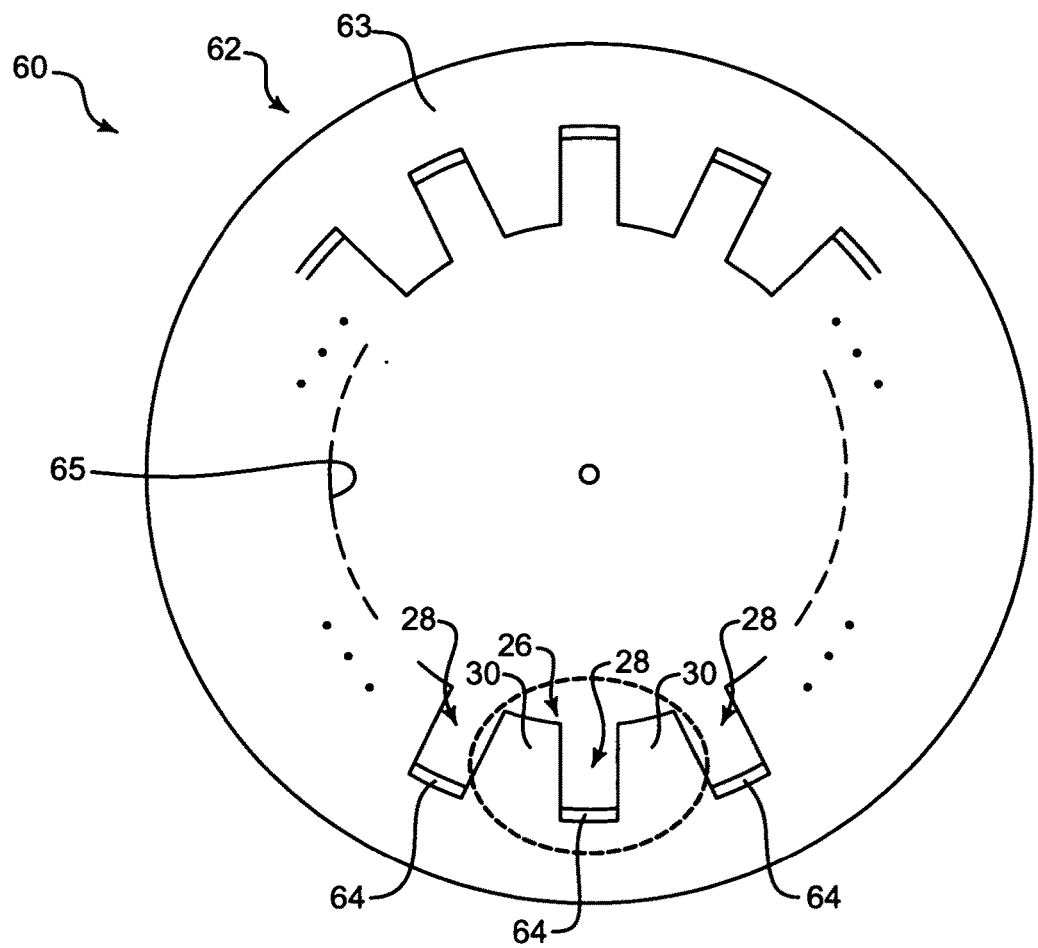
FIG. 5A is a cutaway end plan view in schematic form of a portion of embodiments of the illustrative heat pipes of FIGS. 4A-4D.
Figure 5B:
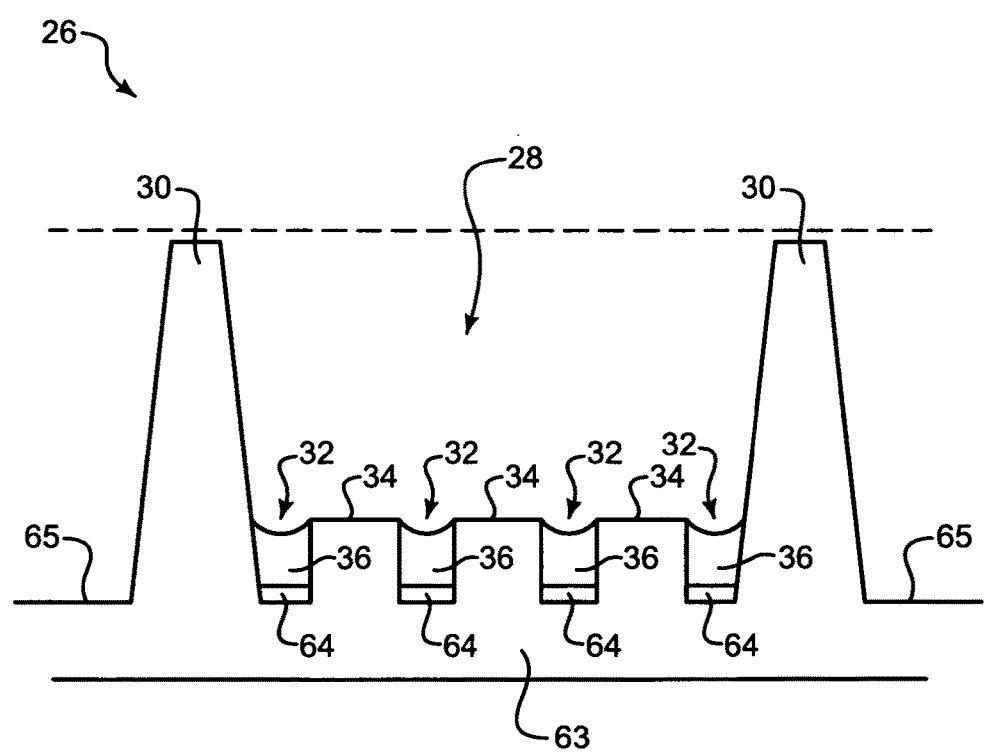
FIG. 5B illustrates details of the portion shown in FIG. 5A.

The heat pipe device 62 defines a cavity 66 therein. A surface 65 of the wall section 63 defines a surface of the cavity 66. In some embodiments, the nuclear fission fuel material 64 is disposed within at least a portion of the cavity 66. For example, referring additionally to FIGS. 5A and 5B, in some embodiments the nuclear fission fuel material 64 may be disposed within the capillary structure 26.

Figure 5C:
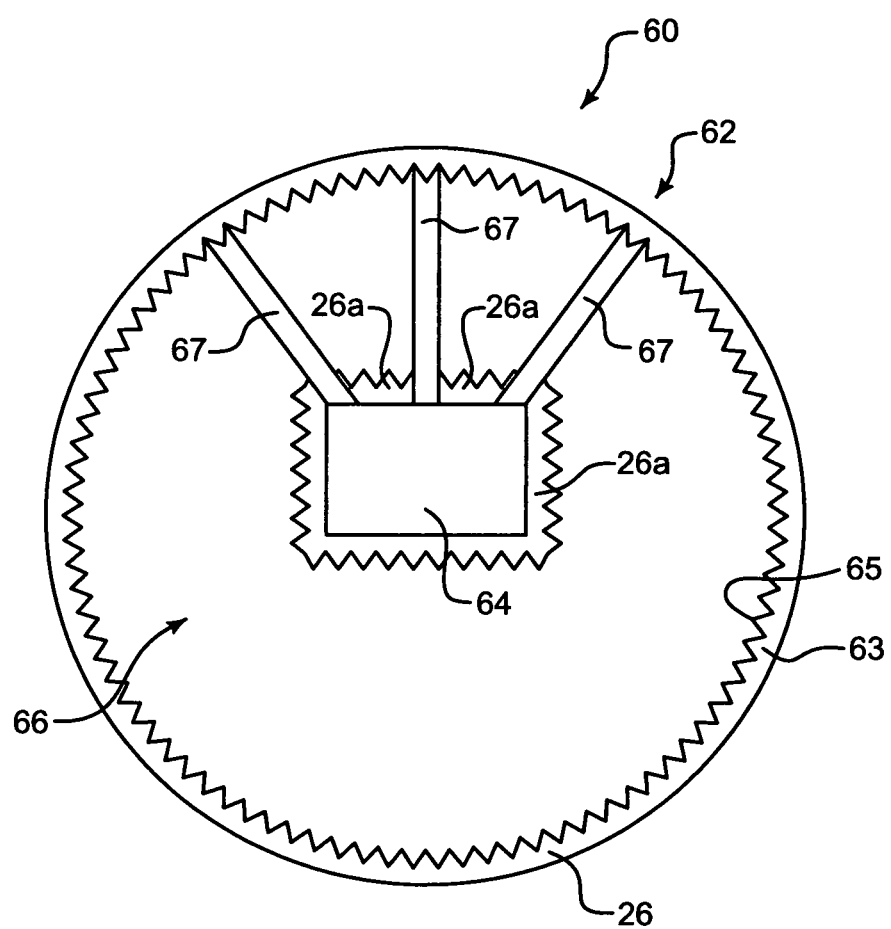
FIG. 5C is a cutaway end plan view in schematic form of a portion of other embodiments of the illustrative heat pipes of FIGS. 4A-4D.

However, it will be appreciated that the nuclear fission fuel material 64 need not be disposed within the capillary structure 26 and may be disposed anywhere whatsoever within the cavity 66 as desired. As another illustrative example given without limitation and referring additionally to FIG. 5C, in some embodiments the nuclear fission fuel material 64 may be disposed within the cavity 64 on one or more support structures 67 that hold the nuclear fission fuel material 64 in place. Additional capillary structure 26A is disposed about the exterior of the nuclear fission fuel material 64. At least one of the support structures 67 is a liquid transport structure, such as a channel, capillary structure, or the like, that can transport the working fluid in its liquid phase via capillary action between the capillary structure 26A disposed about the exterior of the nuclear fission fuel material 64 and the capillary structure 26 disposed about the surface of the cavity 66.

Figure 4A:
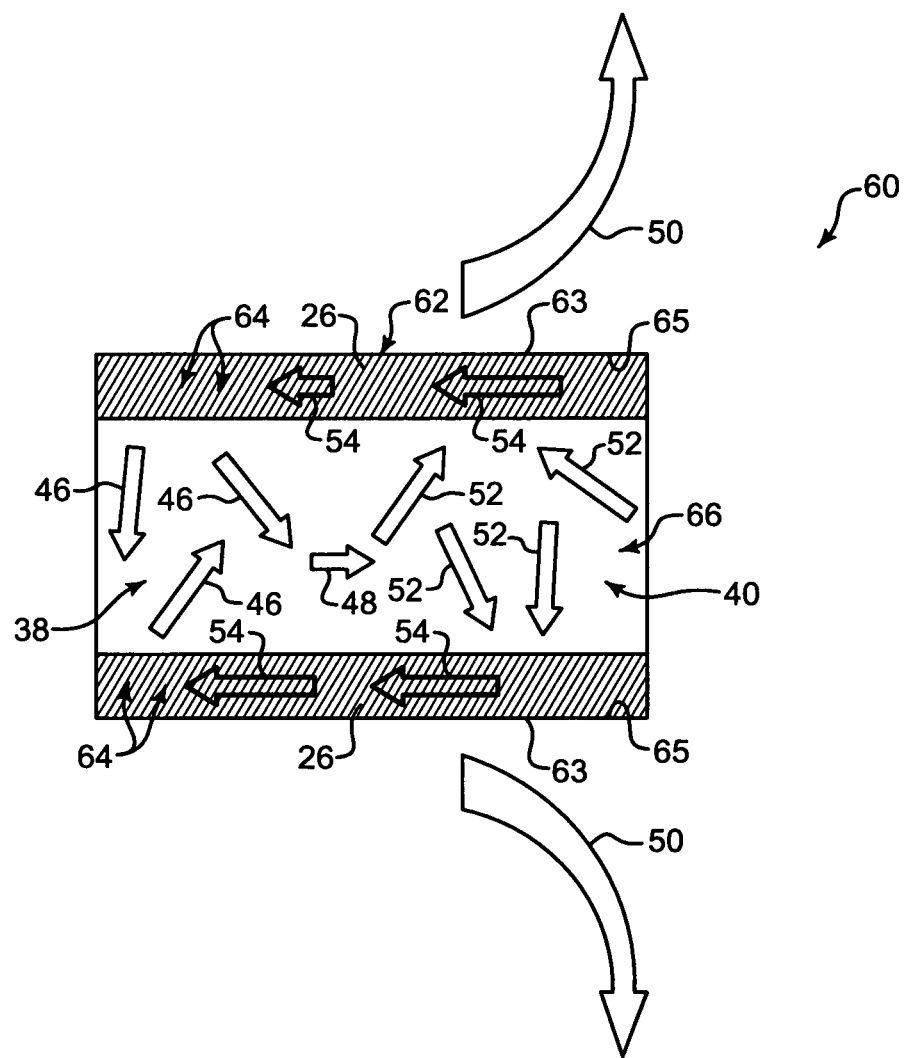
FIG. 4A is a cutaway side plan view in schematic form of an illustrative heat pipe.
Figure 4B:
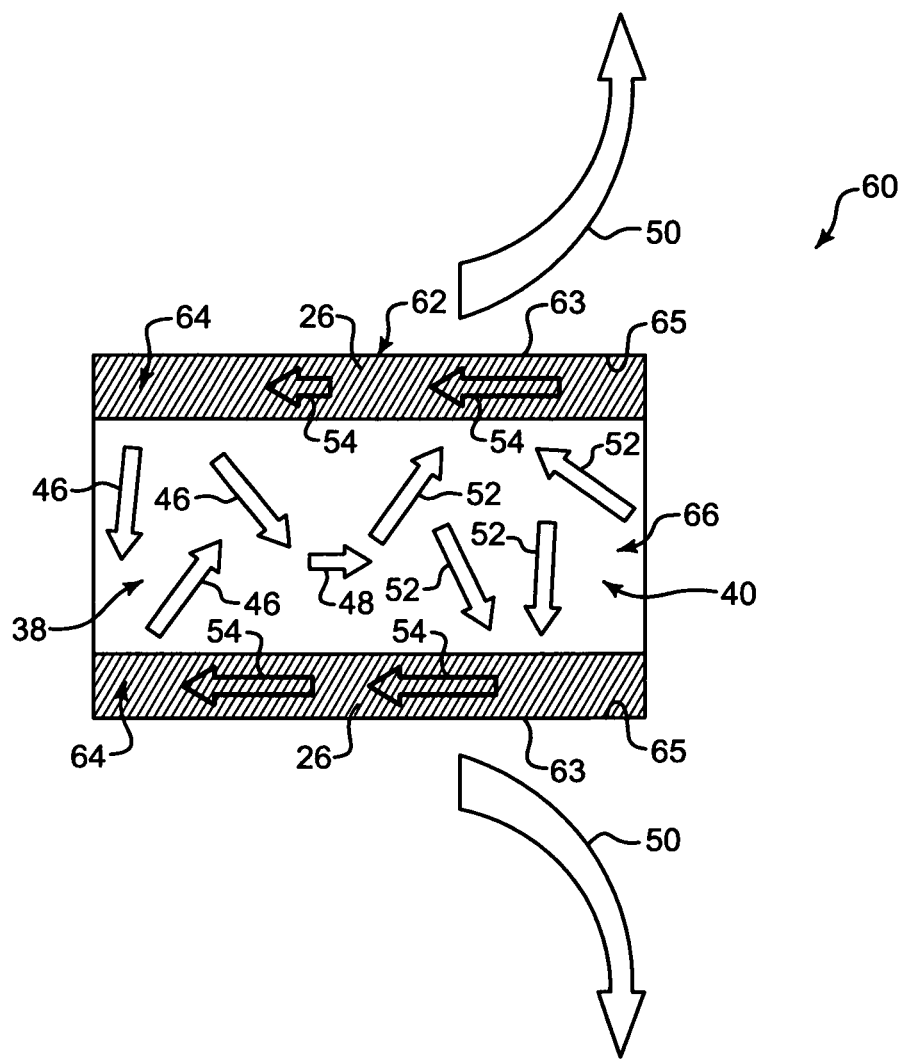
FIG. 4B is a cutaway side plan view in schematic form of another illustrative heat pipe.
Figure 4C:
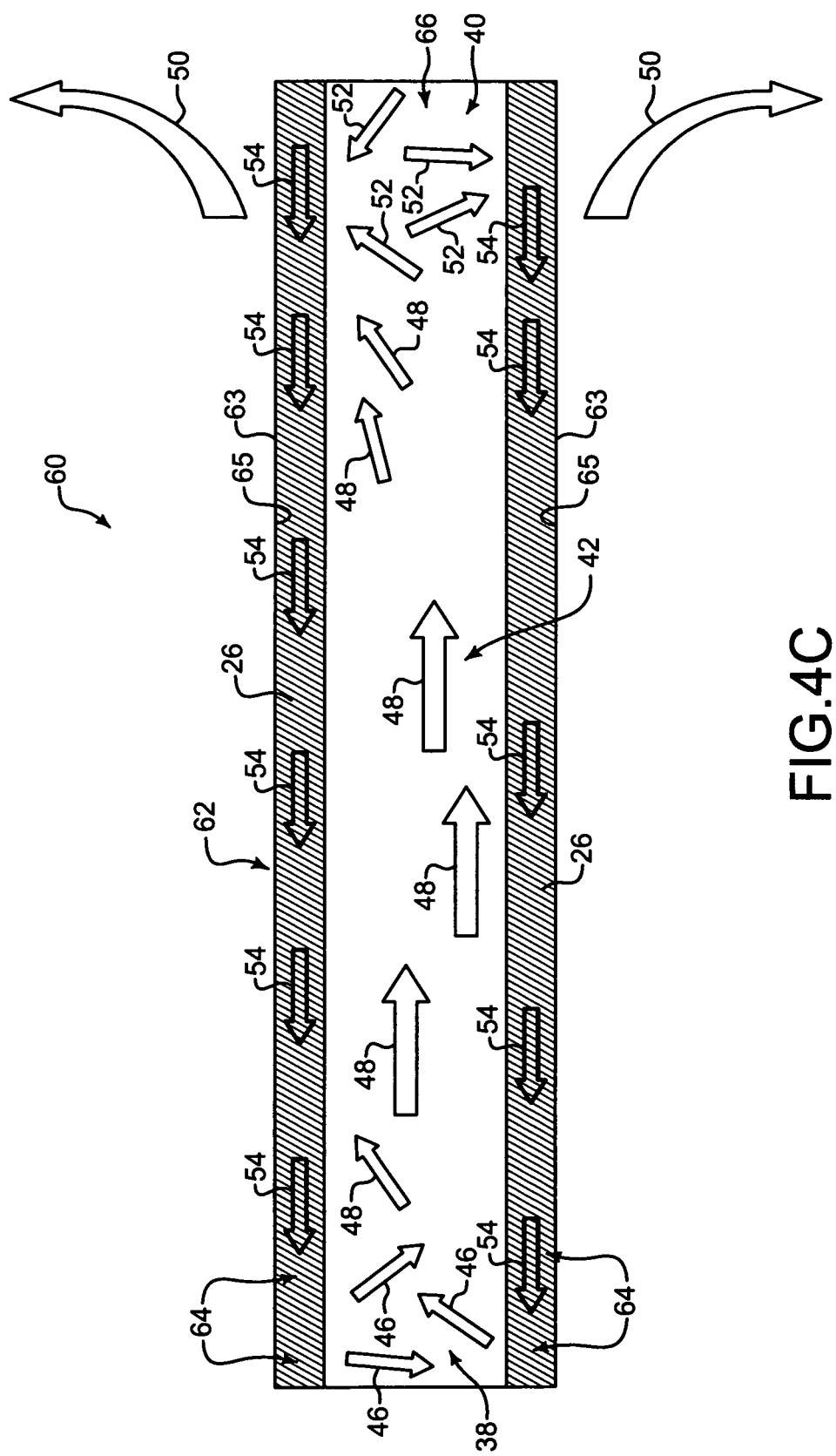
FIG. 4C is a cutaway side plan view in schematic form of another illustrative heat pipe.
Figure 4D:
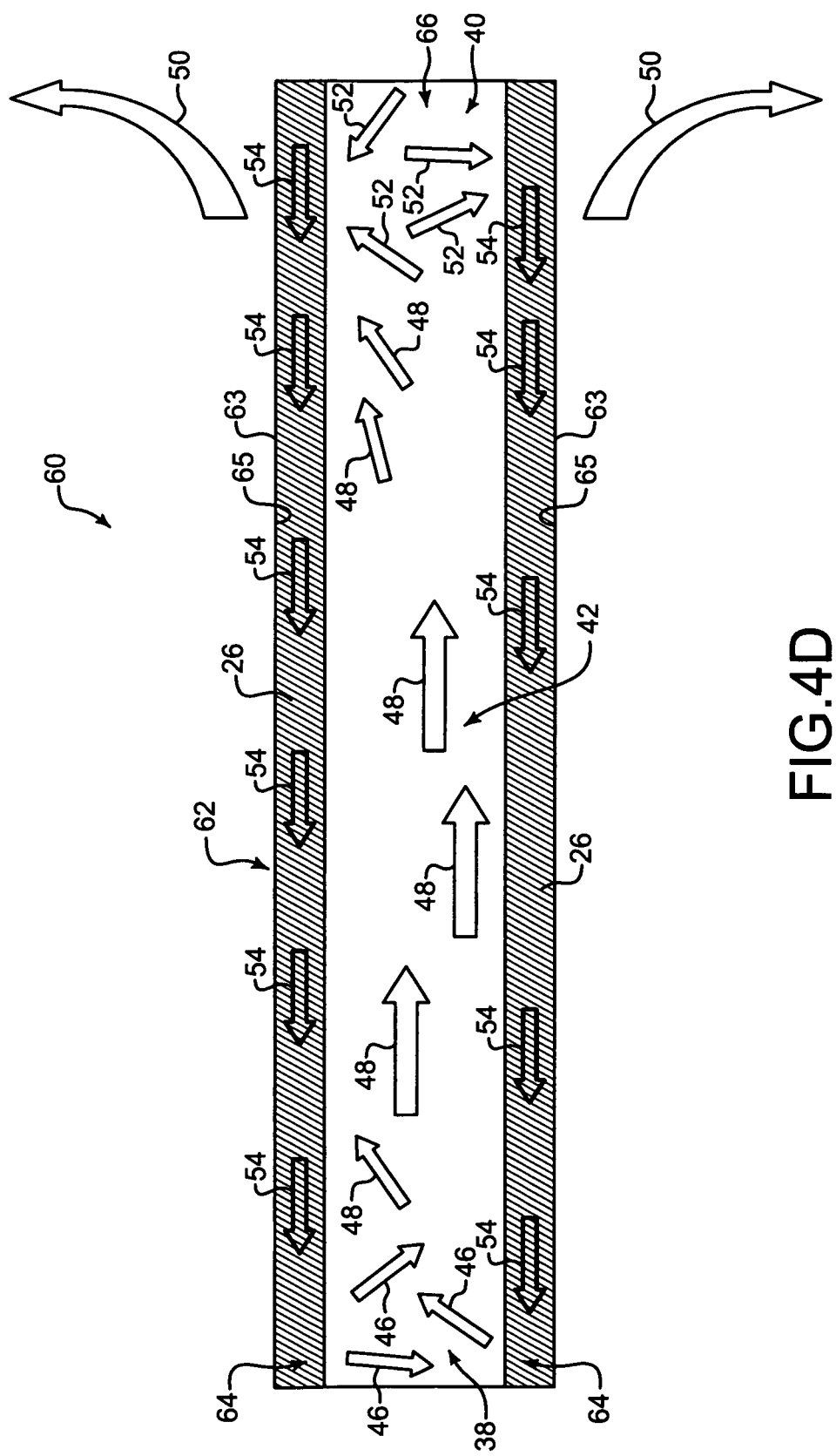
FIG. 4D is a cutaway side plan view in schematic form of another illustrative heat pipe.

The heat pipe device 62 includes the evaporator section 38 and the condenser section 40. In some embodiments and as shown in FIGS. 4A and 4C, the nuclear fission fuel material 64 may be disposed entirely or substantially within the evaporator section 38. However, it will be appreciated that the nuclear fission fuel material 64 need not be disposed entirely or substantially within the evaporator section 38. To that end, in some other embodiments and as shown in FIGS. 4B and 4D, at least a portion of the nuclear fission fuel material 64 is not within the evaporator section 38.

In some embodiments, given by way of non-limiting example the nuclear fission fuel material 64 may have a capillary structure. If desired, in some other embodiments the nuclear fission fuel material 64 may have a sintered powdered fuel microstructure, or a foam microstructure, or a high density microstructure, or the like.

The heat pipe device 62 includes the capillary structure 26. In some embodiments, the capillary structure 26 may include the grooves 28 defined in the surface 65 as described above between the lands 30. In some other embodiments, the capillary structure 26 may include the grooves 32 defined in the surface 65 as described above between the lands 30 and 34. In some other embodiments, the capillary structure may include a wick as described above.

The heat pipe assembly 60 also includes the working fluid 36 as described above. Also, in some embodiments, the heat pipe device 62 may include the adiabatic section 42 (FIGS. 4C and 4D).

Referring now to FIGS. 4A-4D, heat from the nuclear fission fuel material 64 is transferred to the evaporator section 38. The working fluid 36 in the evaporator section 38 evaporates, as indicated by arrows 46, thereby undergoing phase transformation from a liquid to a gas. The working fluid 36 in gaseous form moves through the heat pipe device 62, as indicated by arrows 48, from the evaporator section 38, when applicable (in some embodiments) through the adiabatic section 42 (FIGS. 4C and 4D), and to the condenser section 40. At the condenser section 40, heat from the working fluid 36 is transferred out of the heat pipe device 62, as indicated by arrows 50. The working fluid 36 in the condenser section 40 condenses, as indicated by arrows 52, thereby undergoing phase transformation from a gas to a liquid. The working fluid 36 in liquid form returns from the condenser section 40 to the evaporator section 38, as indicated by arrows 54, via capillary action in the capillary structure 26. When applicable, in some embodiments the working fluid 36 in liquid form returns from the condenser section 40 through the adiabatic section 42 (FIGS. 4C and 4D) to the evaporator section 38.

Figure 6:
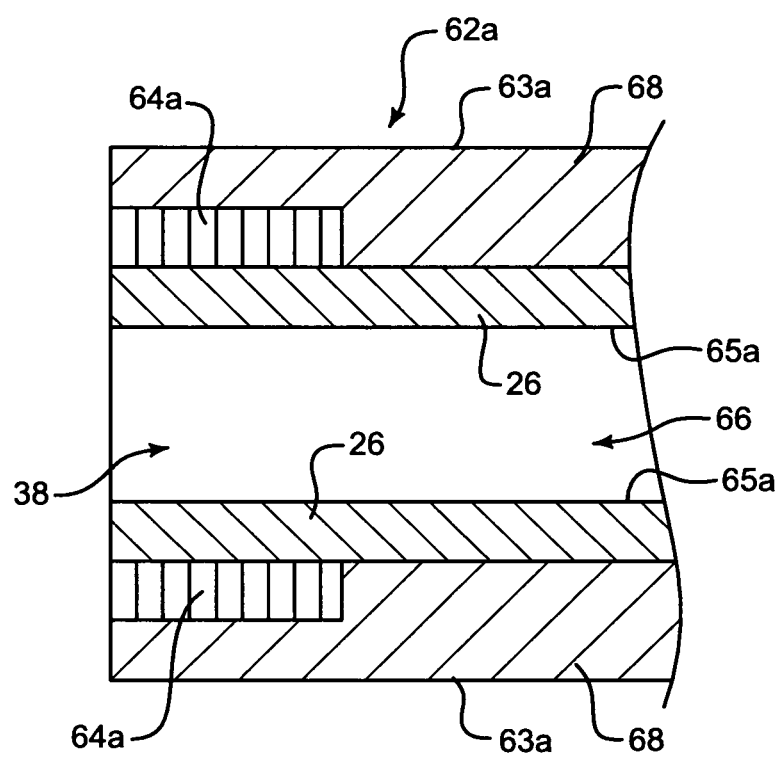
FIG. 6 is a cutaway side plan view in schematic form of a portion of other embodiments of the illustrative heat pipes of FIGS. 4A-4D.

Referring additionally to FIG. 6, in some other embodiments a heat pipe device 62A has a wall section 63A that includes at least one layer of structural material 68 and at least one layer of nuclear fission fuel material 64A. As such, the nuclear fission fuel material 64A can be disposed outside of the cavity 66. For sake of brevity and clarity, only one layer of the nuclear fission fuel material 64A and the structural material 68 are shown. However, it will be appreciated that, in some embodiments, any number of layers of the nuclear fission fuel material 64A and the structural material 68 may be provided as desired. Given by way of non-limiting example, in some embodiments the structural material 68 may include any one or more of materials such as steel, niobium, vanadium, titanium, a refractory metal, and/or a refractory alloy. Given by way of non-limiting example, in some embodiments the refractory metal may be niobium, tantalum, tungsten, hafnium, rhenium, or molybdenum. Non-limiting examples of refractory alloys include, rhenium-tantalum alloys as disclosed in U.S. Pat. No. 6,902,809, tantalum alloy T-111, molybdenum alloy TZM, tungsten alloy MT-185, or niobium alloy Nb-1Zr.

In some embodiments, a layer of the nuclear fission fuel material 64A can be disposed entirely or substantially within the evaporator section 38. However, in other embodiments (not shown) one or more layers of the nuclear fission fuel material 64A may be disposed in at least a portion of the adiabatic section (if provided) and/or the condenser section.

Now that illustrative embodiments of nuclear fission fuel elements and heat pipes have been discussed, illustrative methods associated therewith will now be discussed.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular design paradigms.

Figure 7A:
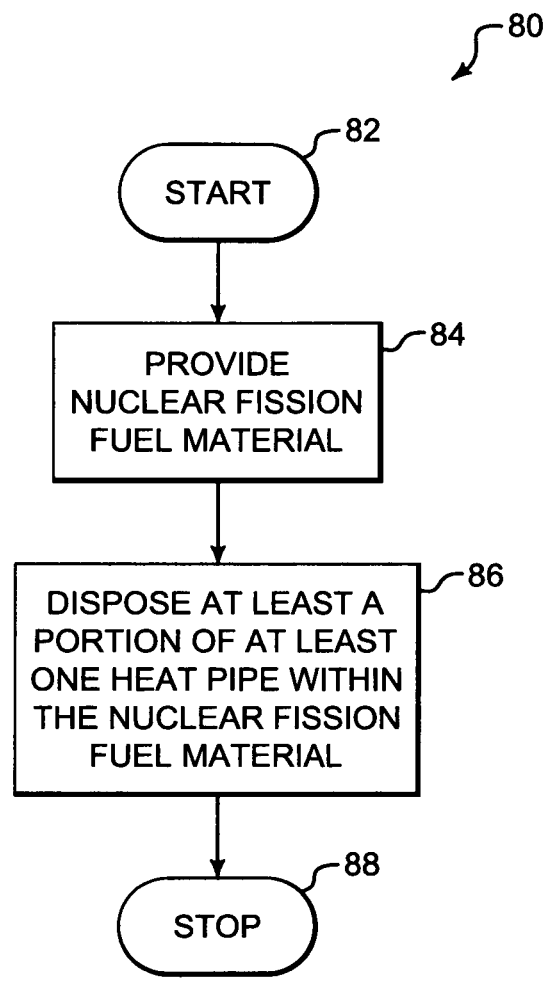
FIG. 7A is a flow chart of an illustrative method of fabricating a nuclear fission fuel element.

Referring now to FIG. 7A, an illustrative method 80 is provided for fabricating a nuclear fission fuel element. The method 80 starts at a block 82. At a block 84 nuclear fission fuel material is provided. At a block 86 at least a portion of at least one heat pipe is disposed within the nuclear fission fuel material. The method 80 stops at a block 88.

Figure 7B:
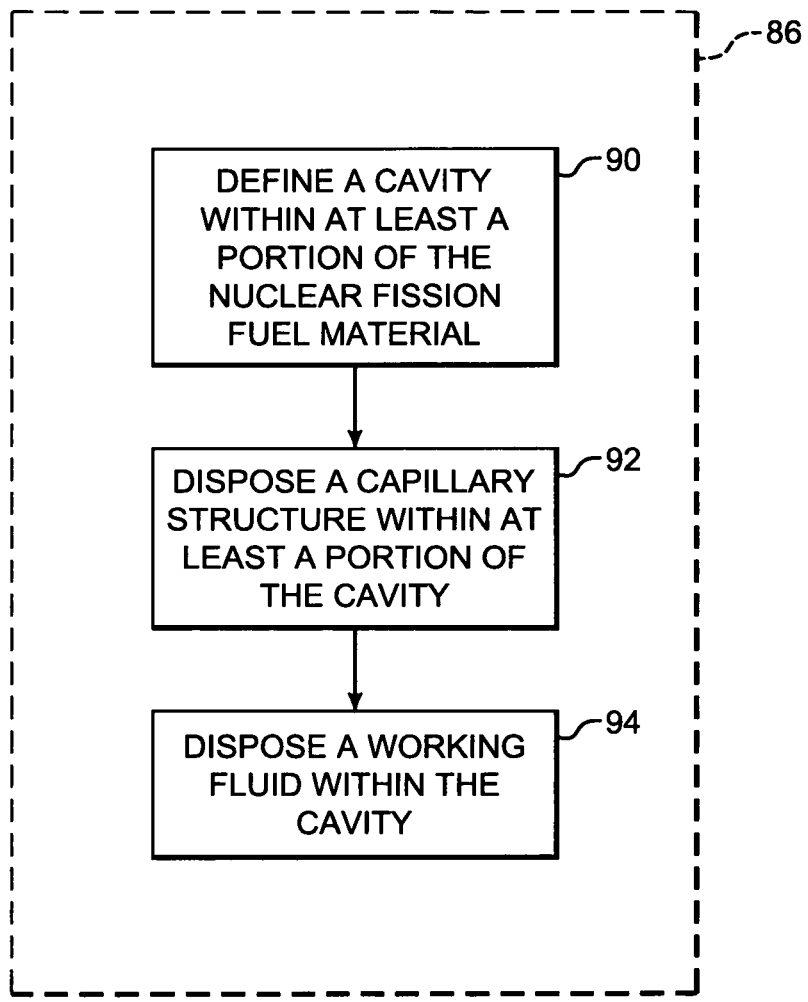
FIGS. 7B-7I are flow charts of details of portions of the flow chart of FIG. 7A.

Referring now to FIG. 7B, in some embodiments disposing at least a portion of at least one heat pipe within the nuclear fission fuel material at the block 86 may include further processes. For example, at a block 90 a cavity may be defined within at least a portion of the nuclear fission fuel material. Also, at a block 92 a capillary structure may be disposed within at least a portion of the cavity. Further, at a block 94 a working fluid may be disposed within the cavity.

Figure 7C:
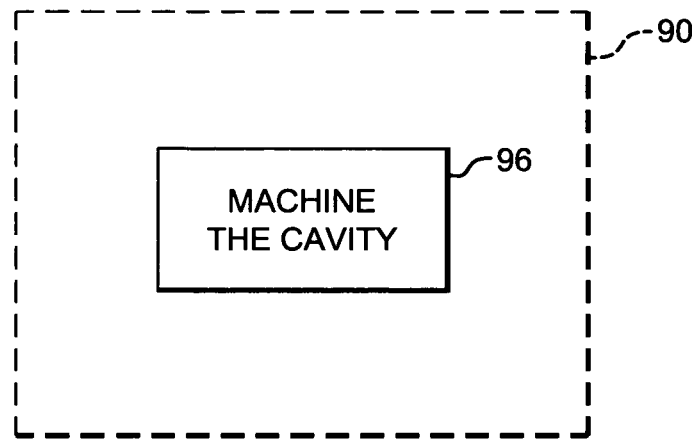

Referring now to FIG. 7C, in some embodiments, defining a cavity within at least a portion of the nuclear fission fuel material at the block 90 can include machining the cavity at a block 96. Given by way of non-limiting example, in some embodiments machining the cavity at the block 96 can be performed by a machining operation such as drilling, milling, stamping, or the like.

Figure 7D:
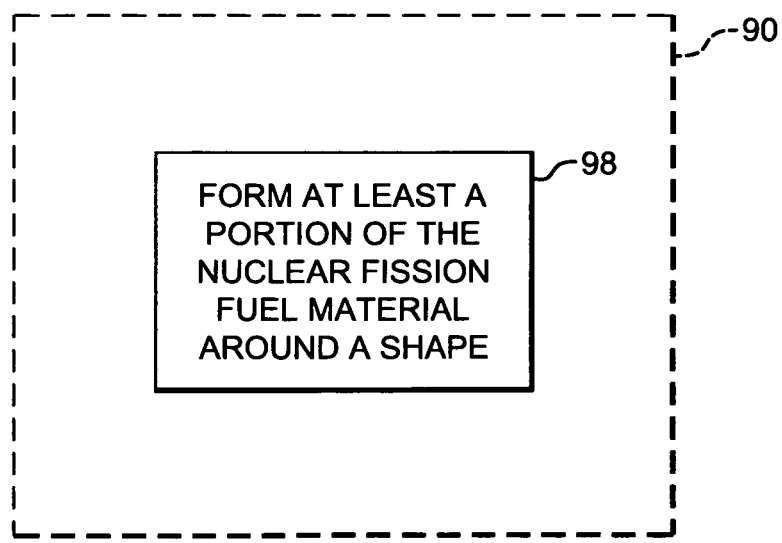

Referring now to FIG. 7D, in some other embodiments, defining a cavity within at least a portion of the nuclear fission fuel material at the block 90 can include forming at least a portion of the nuclear fission fuel material around a shape, such as without limitation a mandrel, at a block 98. Given by way of non-limiting example, in some embodiments forming can be performed by an operation such as welding, casting, electroplating, pressing, molding, or the like.

Figure 7E:
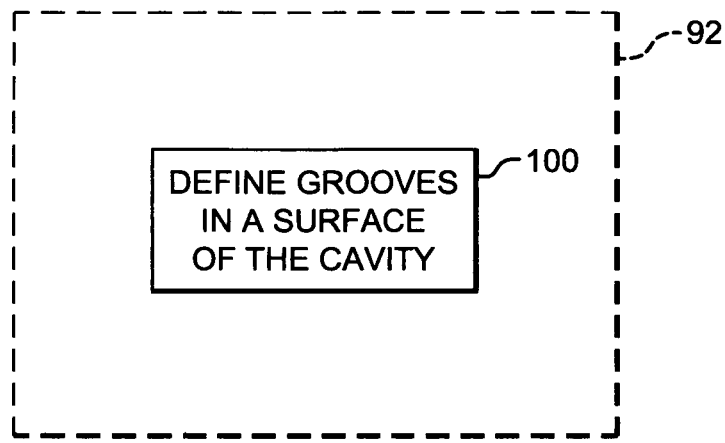

Referring now to FIG. 7E, in some embodiments disposing a capillary structure within at least a portion of the cavity at the block 92 can include defining a plurality of grooves in a surface of the cavity at a block 100. Given by way of non-limiting example, in some embodiments defining a plurality of grooves in a surface of the cavity at the block 100 can be performed by an operation such as machining, etching, casting, stamping, or the like.

Figure 7F:
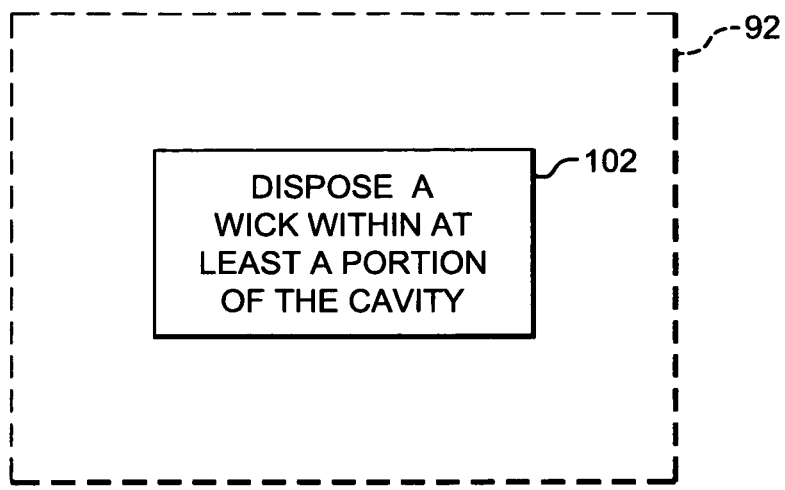

Referring now to FIG. 7F, in some other embodiments disposing a capillary structure within at least a portion of the cavity at the block 92 can include disposing a wick within at least a portion of the cavity at a block 102.

Figure 7G:
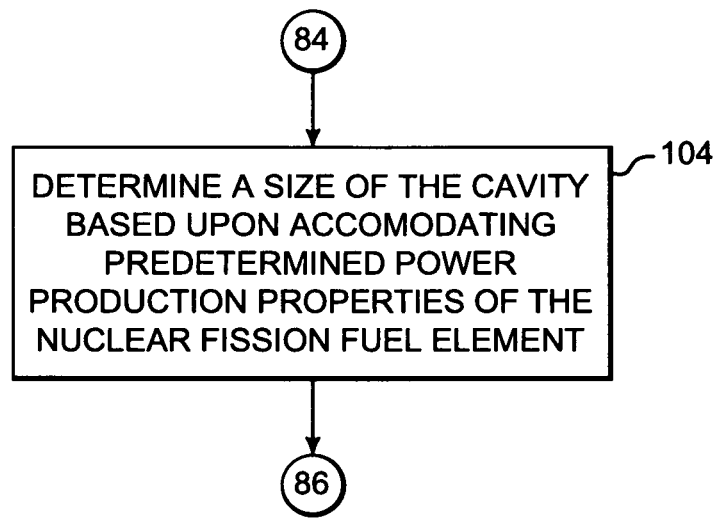

Referring now to FIG. 7G, in some embodiments, before at least a portion of at least one heat pipe is disposed within the nuclear fission fuel material at the block 86, at a block 104 a size of the cavity can be determined based upon accommodating predetermined power production properties of the nuclear fission fuel element. In one example, the cross-sectional area of the cavity may be chosen by dividing a predetermined power production value of the nuclear fission fuel element by a specified axial heat flux value of the working fluid.

Figure 7H:
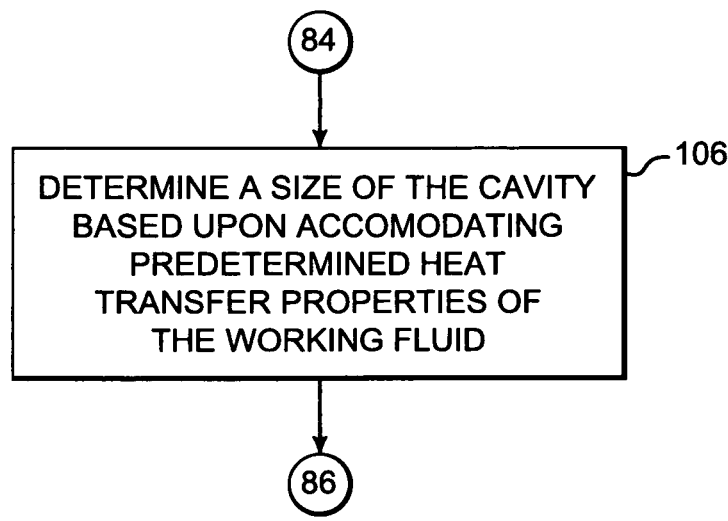

Referring now to FIG. 7H, in some other embodiments, before at least a portion of at least one heat pipe is disposed within the nuclear fission fuel material at the block 86, at a block 106 a size of the cavity can be determined based upon accommodating predetermined heat transfer properties of the working fluid. In one example, the cross-sectional area of the cavity may be chosen in order to achieve a desirable axial heat transport capability from the heat pipe working fluid. In some embodiments, this selection suitably may take into account the operational vapor density of the working fluid, its latent heat of vaporization, and a desirable flow velocity or mach number. In another example, a lateral dimension of the cavity can be chosen in order to provide a desirable Reynold's number for vapor flow.

Figure 7I:
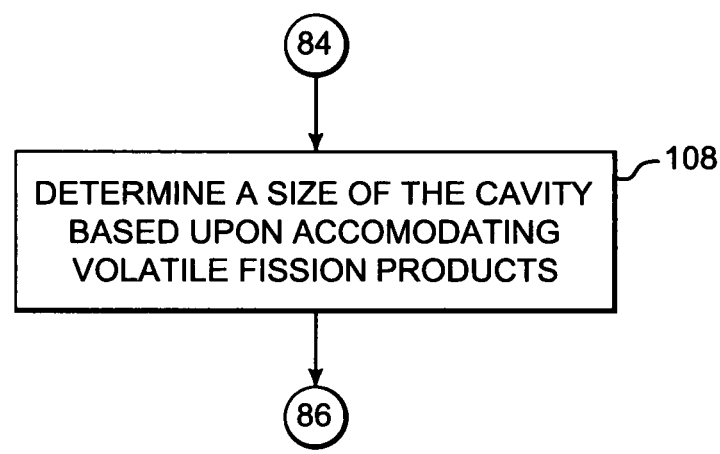

Referring now to FIG. 7I, in some other embodiments, before at least a portion of at least one heat pipe is disposed within the nuclear fission fuel material at the block 86, at a block 108 a size of the cavity can be determined based upon accommodating volatile fission products. In one example, the cavity volume may be selected based upon the pressure developed by a specified amount of gaseous fission products within the volume. In another example, the cavity volume may be selected based upon the effects of the inertia of a specified amount of gaseous fission products within the volume on the heat transfer properties of the heat pipe.

Figure 8A:
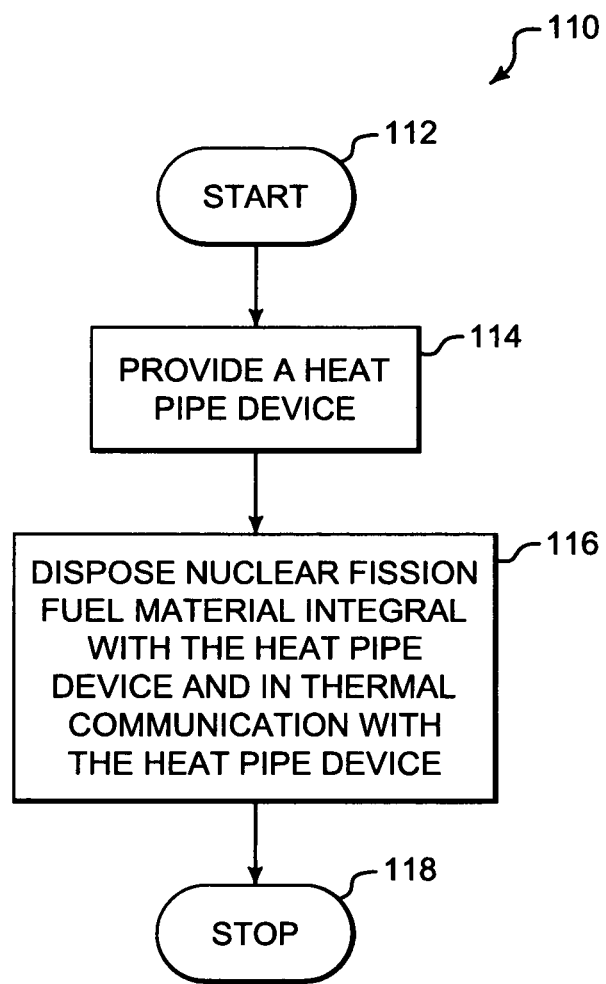
FIG. 8A is a flow chart of an illustrative method of fabricating a heat pipe assembly.

Referring now to FIG. 8A, an illustrative method 110 is provided for fabricating a heat pipe assembly. The method 110 starts at a block 112. At a block 114 a heat pipe device is provided. At a block 116 nuclear fission fuel material is disposed integral with the heat pipe device and in thermal communication with the heat pipe device. The method 110 stops at a block 118.

Figure 8B:
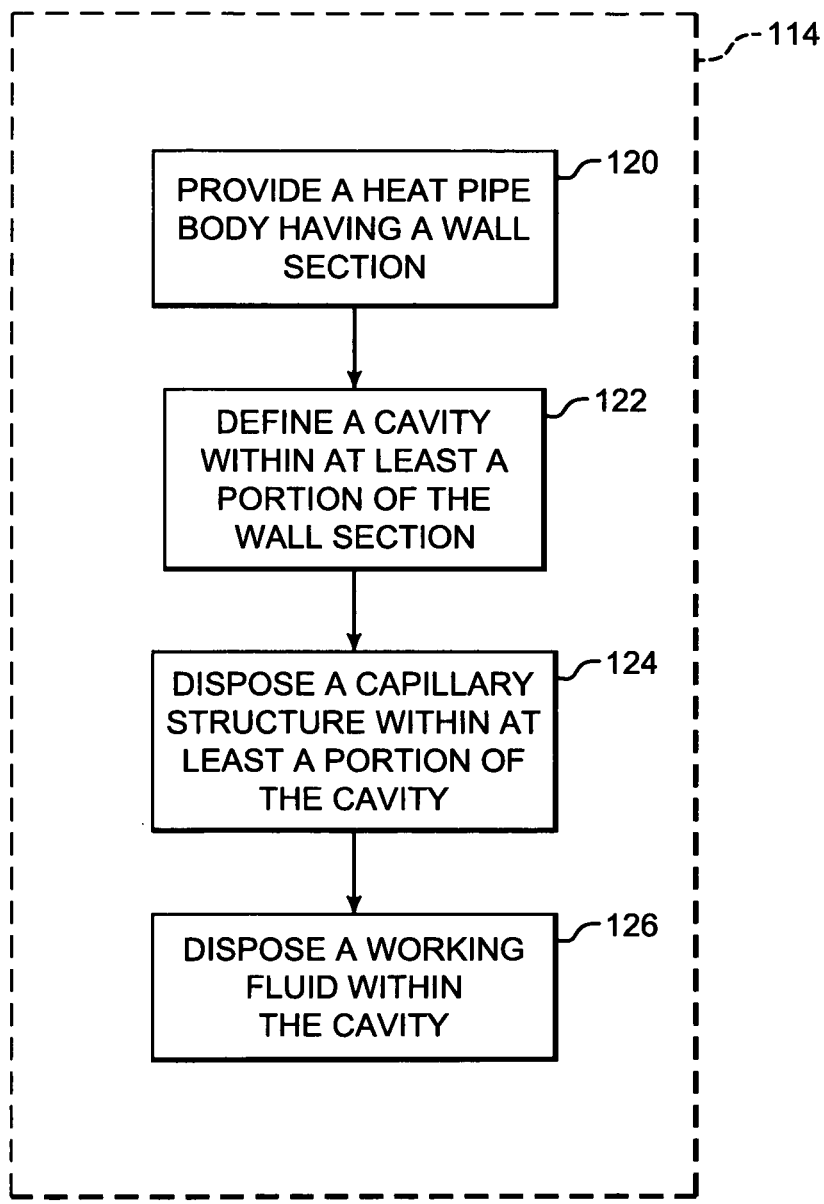
FIGS. 8B-8H are flow charts of details of portions of the flow chart of FIG. 8A.

Referring now to FIG. 8B, in some embodiments providing a heat pipe device at the block 114 may include further processes. For example, at a block 120 a heat pipe body having a wall section may be provided. At a block 122 a cavity may be defined within at least a portion of the wall section. Also, at a block 124 a capillary structure may be disposed within at least a portion of the cavity. Further, at a block 126 a working fluid may be disposed within the cavity.

Figure 8C:
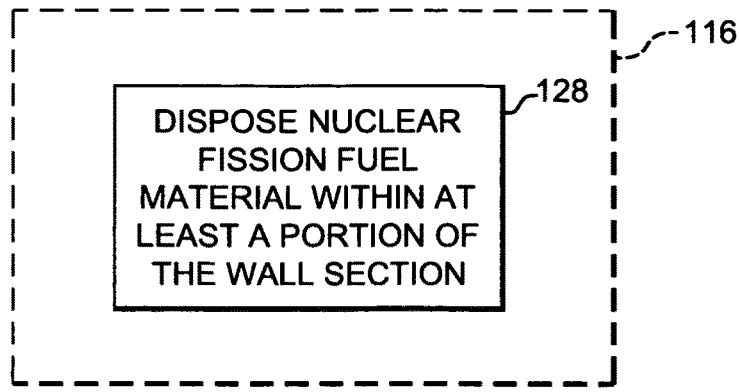
Figure 8D:
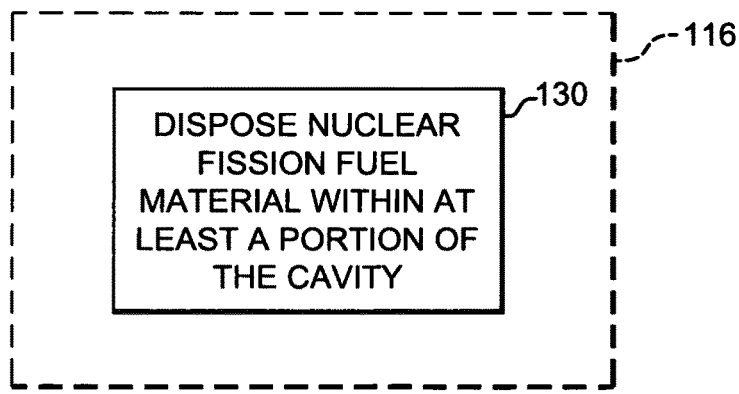

Referring now to FIG. 8C, in some embodiments disposing nuclear fission fuel material in thermal communication with the heat pipe device at the block 116 may include disposing nuclear fission fuel material within at least a portion of the wall section at a block 128. Referring now to FIG. 8D, in some other embodiments disposing nuclear fission fuel material in thermal communication with the heat pipe device at the block 116 may include disposing nuclear fission fuel material within at least a portion of the cavity at a block 130.

Figure 8E:
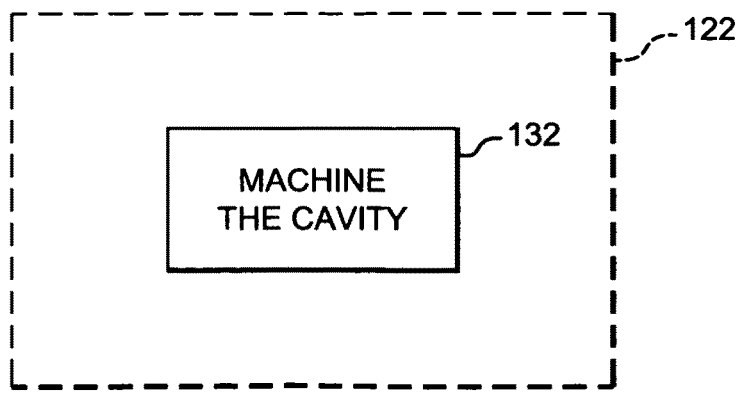

Referring now to FIG. 8E, in some embodiments defining a cavity within the wall section at the block 122 may include machining the cavity. Given by way of non-limiting example, in some embodiments machining the cavity at the block 122 can be performed by a machining operation such as drilling, milling, stamping, or the like.

Figure 8F:
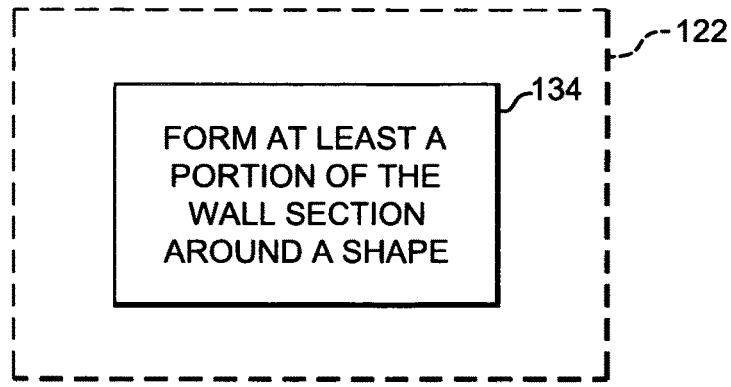

Referring now to FIG. 8F, in some other embodiments defining a cavity within at least a portion of the wall section at the block 122 may include forming the at least a portion of the wall section around a shape, such as without limitation a mandrel, at a block 134. Given by way of non-limiting example, in some embodiments forming can be performed by an operation such as welding, casting, electroplating, pressing, molding, or the like.

Figure 8G:
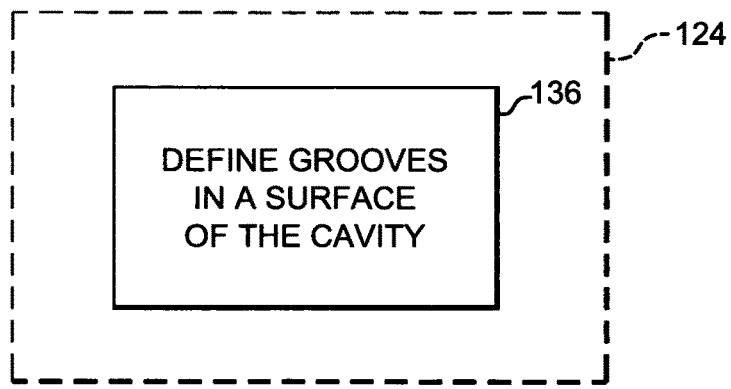

Referring now to FIG. 8G, in some embodiments disposing a capillary structure within at least a portion of the cavity at the block 124 may include defining a plurality of grooves in a surface of the cavity at a block 136. Given by way of non-limiting example, in some embodiments defining a plurality of grooves in a surface of the cavity at the block 136 can be performed by an operation such as machining, etching, casting, stamping, or the like.

Figure 8H:
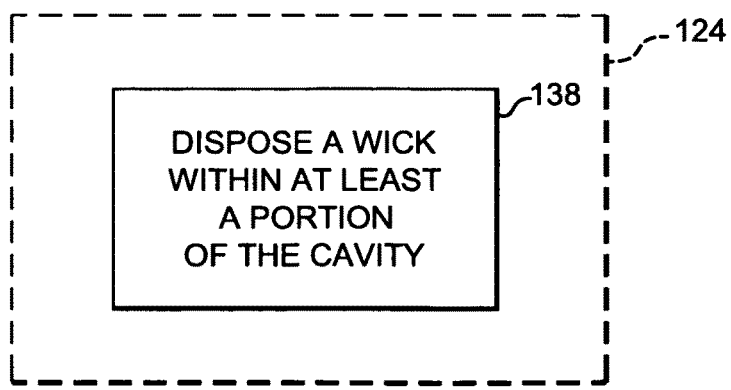

Referring now to FIG. 8H, in some other embodiments disposing a capillary structure within at least a portion of the cavity at the block 124 may include disposing a wick within at least a portion of the cavity at a block 138.

One skilled in the art will recognize that the herein described components (e.g., blocks), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., blocks), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A heat pipe comprising:
   a wall section defining a cavity therein, the wall section including at least one portion including nuclear fission fuel material disposed within a wall at a location external to the cavity, the cavity including an evaporator section and a condenser section;
   a capillary structure internal to at least one portion of the wall section, the capillary structure in fluid communication with the cavity; and a working fluid disposed within the cavity, wherein the working fluid is evaporable to flow from the capillary structure to the cavity in a first direction and condensable to flow from the cavity to the capillary structure in a second direction counter-parallel to the first direction.

2. The heat pipe of claim 1, wherein the cavity further includes an adiabatic section.

3. The heat pipe of claim 1, wherein a portion of the wall section defining at least a portion of the condenser section does not include nuclear fission fuel material.

4. The heat pipe of claim 1, wherein a portion of the wall section defining at least a portion of the evaporator section includes the nuclear fission fuel material disposed within the wall.

5. The heat pipe of claim 2, wherein a portion of the wall section defining at least a portion of the adiabatic section does not include nuclear fission fuel material.

6. The heat pipe of claim 1, wherein the at least one portion of the wall section including the nuclear fission fuel material disposed within the wall includes at least one layer including structural material and at least one other layer including the nuclear fission fuel material.

7. The heat pipe of claim 6, wherein the structural material includes a material chosen from steel, niobium, vanadium, titanium, a refractory metal, and a refractory alloy.

8. The heat pipe of claim 1, wherein the nuclear fission fuel material includes at least one material chosen from fissile material and fertile material.

9. The heat pipe of claim 8, wherein the fissile material includes at least one fissile material chosen from 233U, 235U, and 239Pu.

10. The heat pipe of claim 1, wherein the working fluid includes a fluid chosen from 7Li, sodium, and potassium.

11. The heat pipe of claim 6, wherein the other layer including the nuclear fission fuel material is positioned between the at least one layer including structural material and the capillary structure.

12. The heat pipe of claim 11, wherein a portion of the wall section defining at least a portion of the evaporator section includes the other layer including the nuclear fission fuel material and wherein a portion of the wall section defining at least a portion of the condenser section does not include the nuclear fission fuel material.

13. The heat pipe of claim 1, wherein the capillary structure is internal to the at least one portion of the wall section and external to at least one portion of the cavity.

14. The heat pipe of claim 1, wherein the working fluid flows in a first direction through the cavity and a second opposite direction within the capillary structure.

* * * * *